US012252925B1

(12) United States Patent
Barnes et al.

(10) Patent No.: US 12,252,925 B1
(45) Date of Patent: Mar. 18, 2025

(54) SLIDING DOOR DRIVE SYSTEM

(71) Applicant: Electronic Controls Inc., Cape Canaveral, FL (US)

(72) Inventors: Walter Heidt Barnes, Merritt Island, FL (US); Benjamin Downey, Rockledge, FL (US)

(73) Assignee: Electronic Controls Inc., Cape Canaveral, FL (US)

( * ) Notice: Subject to any disclaimer, the term of this patent is extended or adjusted under 35 U.S.C. 154(b) by 0 days.

(21) Appl. No.: 18/243,752

(22) Filed: Sep. 8, 2023

(51) Int. Cl.
*E05F 15/643* (2015.01)
*E05F 17/00* (2006.01)

(52) U.S. Cl.
CPC ............ *E05F 15/643* (2015.01); *E05F 17/00* (2013.01); *E05F 2017/005* (2013.01); *E05Y 2201/652* (2013.01); *E05Y 2900/104* (2013.01)

(58) Field of Classification Search
CPC ..... E05F 15/643; E05F 15/632; E05F 15/603; E05F 17/004; E05F 17/00; E05F 5/003; E05F 2017/005; E05Y 2201/652; E05Y 2900/104
See application file for complete search history.

(56) References Cited

U.S. PATENT DOCUMENTS 1,534,210 A * 4/1925 Griffith .................. B66B 13/08 49/102
4,259,810 A * 4/1981 West ...................... E05F 15/40 474/169
5,711,112 A * 1/1998 Barten .................. E05F 15/643 49/118
6,193,040 B1 * 2/2001 Cerny .................. F16D 27/112 192/209
6,360,487 B1 * 3/2002 Kern ......................... E06B 3/80 160/197
7,290,369 B2 * 11/2007 Tarrega Lloret ...... E05F 15/643 49/411
8,424,244 B2 * 4/2013 Tarrega Lloret ...... E05F 15/643 49/118
2002/0157317 A1 * 10/2002 Valencia .............. E05F 15/643 49/366
2004/0049984 A1 * 3/2004 Pfaff ....................... E05F 17/00 49/73.1
2005/0160672 A1 * 7/2005 Tarrega Lloret ........ E05F 5/003 49/118
2010/0281776 A1 * 11/2010 Tarrega Lloret ...... E05F 17/004 49/73.1

(Continued)

*Primary Examiner* — Justin B Rephann
(74) *Attorney, Agent, or Firm* — Bradley Arant Boult Cummings LLP

(57) ABSTRACT

A sliding door drive system may include a drive axle and at least one idler axle spaced a part and parallel to each other. The sliding door drive system may further include a first pair of gears having a first radius, each of which is coupled to a different one of the drive axle and the at least one idler axle. The sliding door drive system may further include a second pair of gears having a second radius larger than the first radius. The sliding door drive system may further include a first drive belt coupled between the first pair of gears, and a second drive belt coupled between the second pair of gears. The sliding door drive system may further include a first door bracket coupled to the first drive belt and a second door bracket coupled to the second drive belt.

20 Claims, 16 Drawing Sheets

(56) References Cited

U.S. PATENT DOCUMENTS

| | | | | |
|---|---|---|---|---|
| 2016/0024833 | A1* | 1/2016 | Miller | E05F 15/643<br>49/404 |
| 2018/0266169 | A1* | 9/2018 | Wray | E06B 3/924 |
| 2020/0355011 | A1* | 11/2020 | Mareaux | E05D 15/0621 |
| 2023/0096802 | A1* | 3/2023 | Patel | E05F 15/643<br>16/93 R |

* cited by examiner

SLIDING DOOR DRIVE SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to sliding door drive systems. More particularly, the present disclosure pertains to stacker-type sliding door drive systems such as, for example, elevator door operators.

BACKGROUND OF THE INVENTION

Many types of sliding doors exist in the market today. A popular type is stacker-type sliding doors that slide into a recess or storage area positioned on either a left-hand side or a right-hand side of the doors. Bi-parting stacker-type sliding doors also exist and, as the name implies, some of the doors slide into a left-hand recess area while the others slide into a right-hand recess area. Stacker-type sliding doors are commonly implemented for residential applications, commercial applications and are even quite popular for elevator applications.

In the context of elevator doors, at least one of the doors is driven by a belt. Movement of the belt-driven door forces the use of complicated coupling systems that make the movement of other doors dependent upon the movement of the belt-driven door. For example, linkage parts such as cables, pullies, drive bars, and the like may be implemented to couple the movement of the belt-driven door with the other doors. As a result, operational problems are common after installation due to the excessive amount of linkage parts. Moreover, as wear and tear on these linkage parts differs from that of the belt, additional inspections and maintenance may be necessary to property maintain the elevator drive door drive system.

In view of at least some of the above-referenced problems in conventional sliding door drive systems implementations, a need in the art exists for an improved sliding door drive system or elevator door operator. The present disclosure describes and provides such systems.

BRIEF SUMMARY OF THE INVENTION

A system of the present disclosure may feature a drive axle driven by a drive motor and at least one idler axle spaced apart from and parallel to the drive axle. In some embodiments, each of the at least one idler axle may be co-linear. The system may further feature first and second pairs of gears where the second pair has a radius larger than the first pair. In other embodiments, each gear of the first pair of gears may be coupled to a different one of the drive axle or the at least one idler axle (e.g., a first idler axle), and each gear of the second pair of gears may be coupled to a different one of the drive axle and the at least one idler axle (e.g., a second idler axle). In yet other optional embodiments, a one of each of the first and second pairs of gears may be coupled to a singular idler axle.

The system may feature a first drive belt coupled between the first pair of gears and a second drive belt coupled between the second pair of drive gears. The system may also feature a first door bracket coupled to the first drive belt and a second door bracket coupled to the second drive belt, both of which may moved between respective deployed positions and respective stored positions in a same direction but at different speeds, as determined by the difference in gear sizes.

In various embodiments, a sliding door drive system as disclosed herein may be configured as a two-speed side open configuration, a three-speed side open configuration, a two-speed center open configuration, a three-speed center open configuration, or the like.

In this aspect, a two-speed side open configuration may use a double-panel door that slides in one motion. More particularly, one door slides behind the other and then both disappear into one side of the wall. This helps to reduce the need to have spaces between the elevator cabs that are the full width of the elevator door. A three-speed side open configuration further reduces the necessary storage space while increasing the opening size when the doors are open.

A two-speed center open configuration may have four panels where two panels slide to the left and two slide to the right. The double panels on either side stack up behind each other to save space. The three-speed center open configuration may have six panels and similar benefits to that of the three-speed side open configuration discussed above.

In a particular embodiment, a sliding door drive system as disclosed herein may include a drive axle, at least one idler axle, a first pair of gears, a second pair of gears, a first continuous drive belt, a second continuous drive belt, a first door bracket, and a second door bracket. The drive axle may be spaced apart and parallel to the at least one idler axle. The drive axle may be driven by a drive motor. Each of the first pair of gears may have a first radius. Each of the first pair of gears may be coupled to a different one of the drive axle and the at least one idler axle and aligned with each other. Each of the second pair of gears may be a second radius larger than the first radius. Each of the second pair of gears may be coupled to a different one of the drive axle and the at least one idler axle. The second pair of gears may be aligned with each other and spaced apart from the first pair of gears on the drive axle and the at least one idler axle, respectively. The first continuous drive belt may be coupled between the first pair of gears. The second continuous drive belt may be coupled between the second pair of gears. The first door bracket may be coupled to the first continuous drive belt. The first door bracket may be configured to move between a first deployed position and a first stored position. The second door bracket may be coupled to the second continuous drive belt. The second door bracket may be configured to move between a second deployed position and a second stored position.

In one aspect according to the above-referenced embodiment, a first distance may be defined between the first deployed position and the first stored position, and a second distance may be defined between the second deployed position and the second stored position. The second distance may be greater than the first distance.

In another aspect according to the above-referenced embodiment, a spacing between the drive and the at least one idler axle may be greater than the second distance and less than or equal to a summation of the first and second distances.

In another aspect according to the above-referenced embodiment, the first stored position may be aligned with the second stored position.

In another aspect according to the above-referenced embodiment, the second door bracket may travel between the second deployed position and the second stored position at a faster speed than that at which the first door bracket travels between the first deployed position and the first stored position.

In another aspect according to the above-referenced embodiment, the first door bracket may move between the first deployed position and the first stored position in a same time period as the second door bracket moves between the second deployed position and the second stored position.

In another aspect according to the above-referenced embodiment, the first door bracket may be configured to be coupled to a first door slidably coupled to a first door track, and the second door bracket may be configured to be coupled to a second door slidably coupled to a second door track. The second door track may be positioned adjacent to the first door track.

In another aspect according to the above-referenced embodiment, a ratio between the first radius and the second radius may be based at least in part on respective widths of the first and second doors.

In another aspect according to the above-referenced embodiment, the ratio is 1:2.

In another aspect according to the above-referenced embodiment, the first continuous drive belt may be positioned above the first door track, and the second continuous belt may be positioned above the second door track In another aspect according to the above-referenced embodiment, the sliding door drive system may further include a third pair of gears, a third continuous drive belt, and a third door bracket. Each of the third pair of gears may have a third radius larger than the second radius. Each of the third pair of gears may be coupled to a different one of the drive axle and the at least one idler axle. The third pair of gears may be aligned with each other and spaced apart from the first and second pairs of gears on the drive axle and the at least one idler axle, respectively. The third continuous drive belt may be coupled between the third pair of gears. The third door bracket may be coupled to the third continuous drive belt. The third door bracket may be configured to move between a third deployed position and a third stored position.

In another aspect according to the above-referenced embodiment, the third stored position may be aligned with each of the first and second stored positions.

In another aspect according to the above-referenced embodiment, a third distance may be defined between the third deployed position and the third stored position. The third distance may be greater than the second distance.

In another aspect according to the above-referenced embodiment, the sliding door drive system may further include a four door bracket, a fifth door bracket, and a sixth door bracket. The fourth door bracket may be coupled to the first continuous drive belt and may be configured to move between a fourth deployed position and a fourth stored position. The fourth deployed position may be positioned closer to the first deployed position than the fourth stored position is to the first stored position. The fifth door bracket may be coupled to the second continuous drive belt and may be configured to move between a fifth deployed position and a fifth stored position. The fifth deployed position may be positioned closer to the second deployed position than the fifth stored position is to the second stored position. The sixth door bracket may be coupled to the third continuous drive belt and may be configured to move between a sixth deployed position and a sixth stored position. The sixth deployed position may be positioned closer to the third deployed position than the sixth stored position is to the third stored position.

In another aspect according to the above-referenced embodiment, each of the fourth, fifth, and sixth stored positions may be aligned.

In another aspect according to the above-referenced embodiment, each of the first, second, and third continuous drive belts may include an upper portion and a lower portion defined between the first, second, or third pairs of gears, respectively. The first, second, and third door brackets may be coupled the upper portion of the first, second, or third continuous drive belts, respectively. The fourth, fifth, and sixth door brackets may be coupled to the lower portion of the first, second, or third continuous drive belts, respectively.

In another aspect according to the above-referenced embodiment, each of the first, second, third, fourth, fifth, and sixth door brackets may be associated with a first, second, third, fourth, fifth, and sixth door, respectively.

In another aspect according to the above-referenced embodiment, the sliding door drive system may further include a fourth door bracket and a fifth door bracket. The fourth door bracket may be coupled to the first continuous drive belt and may be configured to move between a fourth deployed position and a fourth stored position. The fourth deployed position may be positioned closer to the first deployed position than the fourth stored position is to the first stored position. The fifth door bracket may be coupled to the second continuous drive belt and may be configured to move between a fifth deployed position and a fifth stored position. The fifth deployed position may be positioned closer to the second deployed position than the fifth stored position is to the second stored position.

In another aspect according to the above-referenced embodiment, each of the first and second continuous drive belts may include an upper portion and a lower portion defined between the first or second pairs of gears, respectively. The first and second door brackets may be coupled the upper portion of the first or second continuous drive belts, respectively. The fourth and fifth door brackets may be coupled to the lower portion of the first or second continuous drive belts, respectively.

In another aspect according to the above-referenced embodiment, the first door bracket may be configured to be coupled to a first door slidably coupled to a first door track, the second door bracket may be configured to be coupled to a second door slidably coupled to a second door track, the second door track positioned adjacent to the first door track, the third door bracket may be configured to be coupled to a third door slidably coupled to the first door track, and the fourth door bracket may be configured to be coupled to a fourth door slidably coupled to the second door track.

The present disclosure further relates to [to be added once claims are finalized]

DETAILED DESCRIPTION OF THE INVENTION

Figure 1:
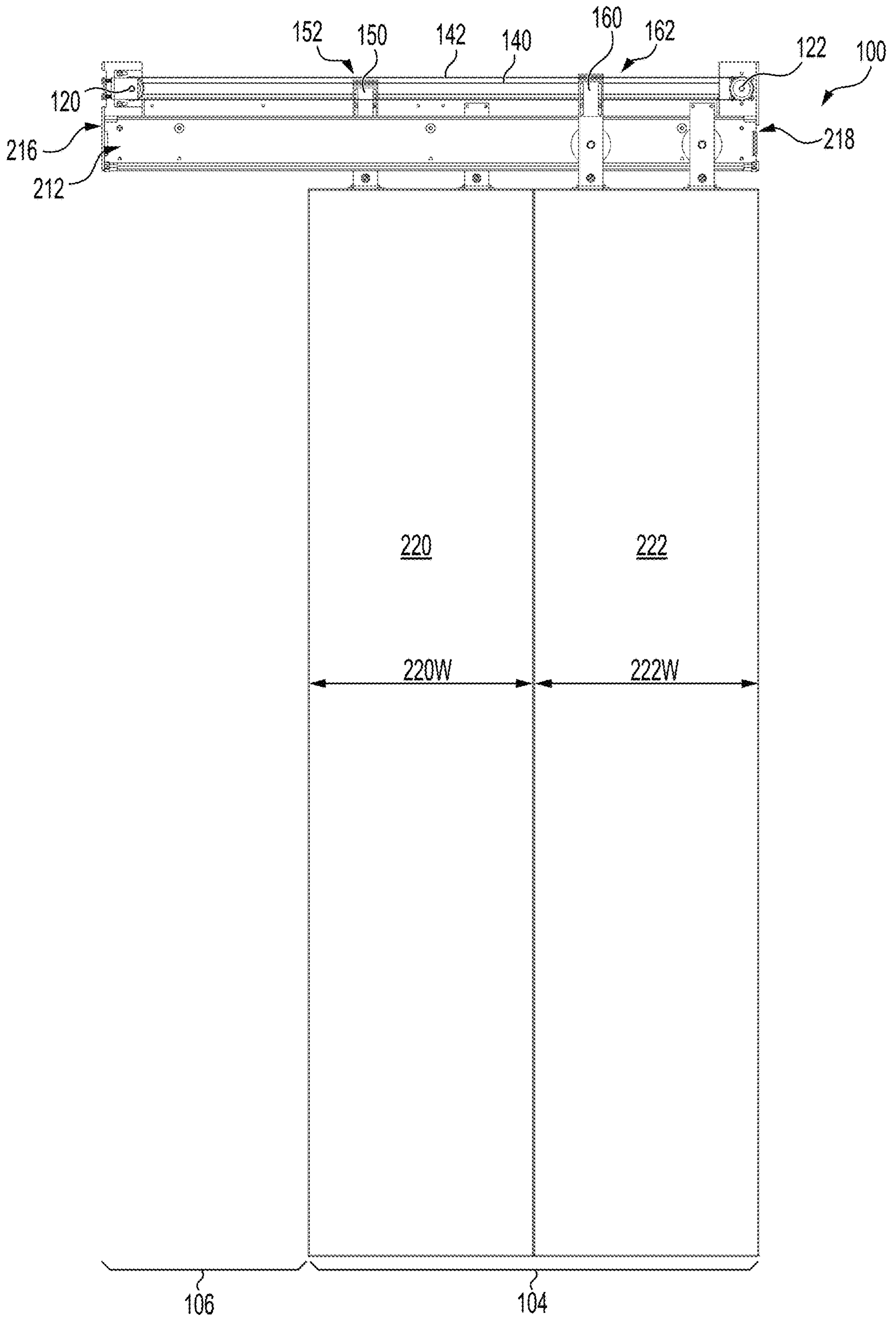
FIG. 1 is a front elevational view of an embodiment of a sliding door drive system in a two-speed side open configuration in accordance with the present disclosure.
Figure 2:
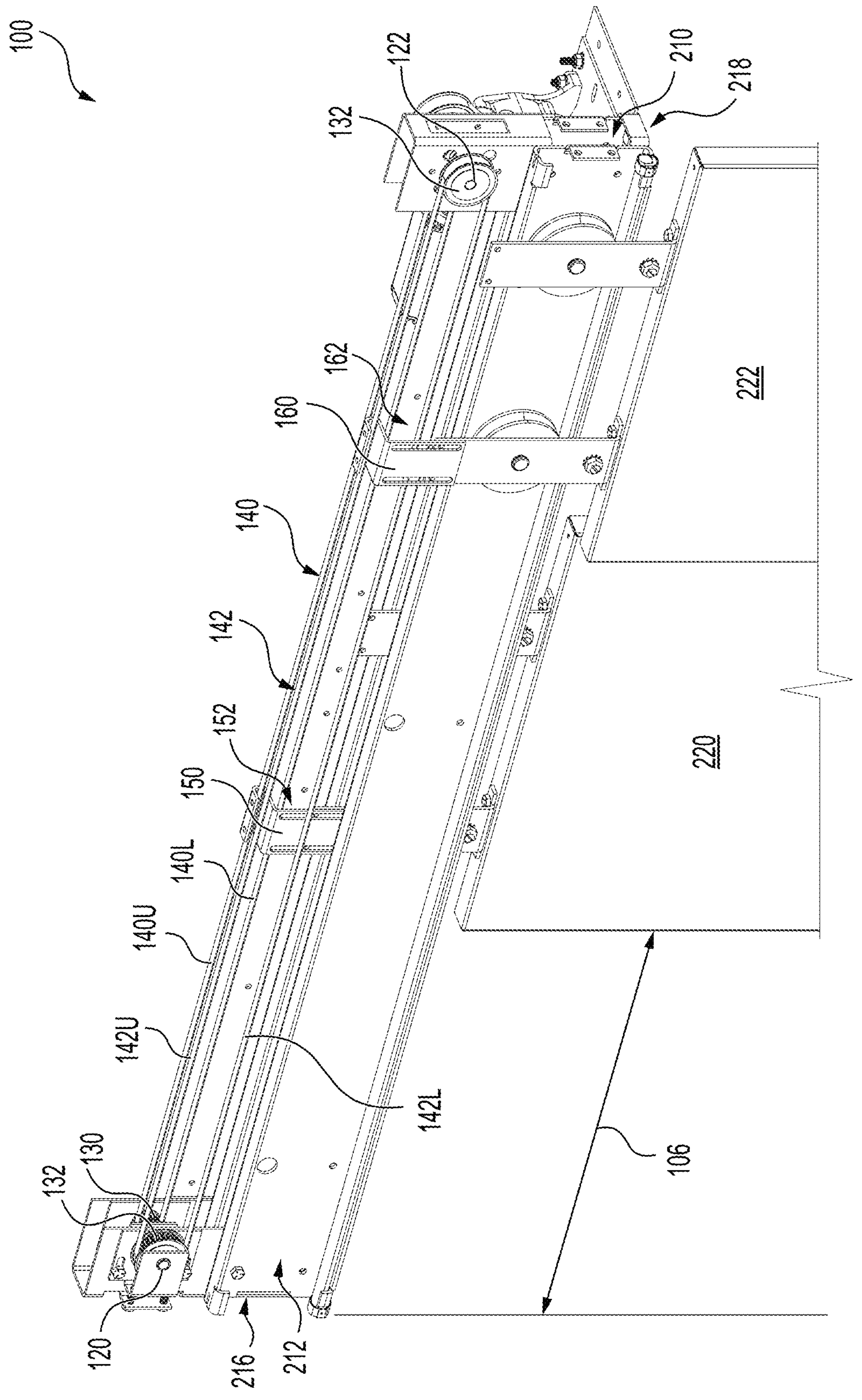
FIG. 2 is a perspective view of the sliding door drive system of FIG. 1 with doors in a closed position in accordance with the present disclosure.
Figure 3:
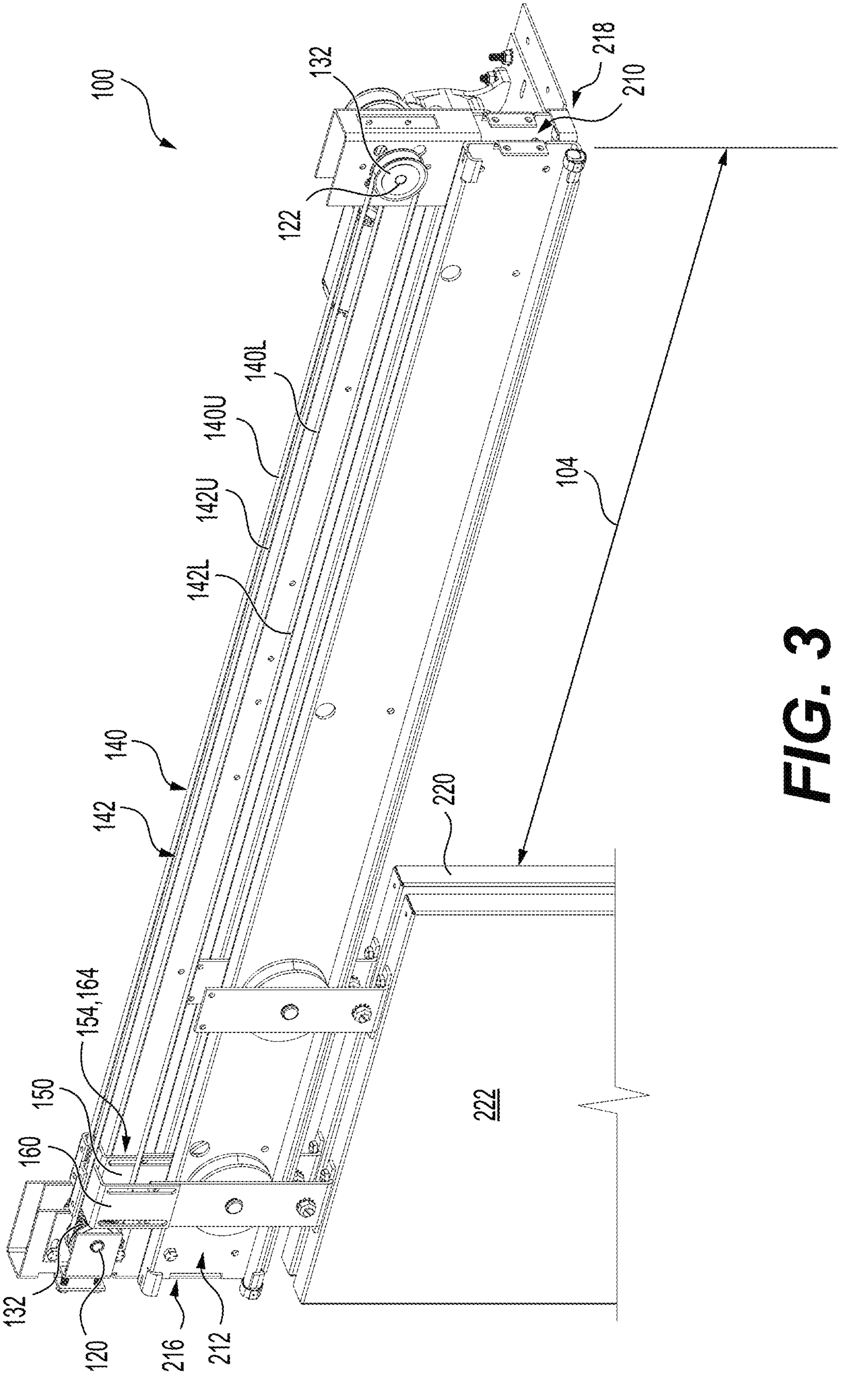
FIG. 3 is a perspective view of the sliding door drive system of FIG. 1 with the doors in an open position in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-22, various embodiments of a sliding door drive system 100 are illustrated. The sliding door drive system 100 may also be referred to herein as an elevator door operator 100. While illustrated using elevator doors, a person of ordinary skill in the art would appreciate that the sliding door drive system 100 may be applicable and is contemplated for use with other types of residential and/or commercial sliding doors in order to add automation thereto.

The sliding door drive system 100 may include a drive axle 122 and at least one idler axle 120 spaced a part and positioned parallel to each other. The sliding door drive system 100 may further include a drive motor 124 coupled to the drive axle 122 and configured to drive said axle. The drive motor 124 may be configured to be coupled to a header plate 102. The header plate 102 may also be referred to herein as a frame 102 or sliding door frame 102. The header plate 102 may span a width of an opening 104 plus any cavity or recess 106 configured to receive and hide the doors when opened. The drive axle 122 and the at least one idler axle 120 may be fixedly positioned relative to opposite ends of the header plate 102. In other optional embodiments, not including a header plate 102, the drive axle 122 and the at least one idler axle 120 may generally be spaced apart by the width of the opening plus any cavity, recess, or storage area configured to receive and hide the doors when opened.

The sliding door drive system 100 may further include a first pair of gears 130 and a second pair of gears 132. Each of the first pair of gears 130 may be coupled to a different one of the drive axle 122 and the at least one idler axle 120 and may further be aligned with each other. One gear of the first pair of gears 130 may be coupled to a first idler axle. Each of the first pair of gears 130 may have a first radius 130R. Each of the second pair of gears 132 may be coupled to a different one of the drive axle 122 and the at least one idler axle 120. One gear of the second pair of gears 132 may be coupled to a second idler axle. In certain optional embodiments (not shown), the one of each of the first and second pairs of gears 130, 132 may be coupled to a singular idler axle. The second pair of gears 132 may be aligned with each other and spaced apart from the first pair of gears 130 on the drive axle 122 and the at least one idler axle 120, respectively. Each of the second pair of gears 132 may have a second radius 132R larger than the first radius 130R.

The sliding door drive system 100 may further include a first continuous drive belt 140 and a second continuous drive belt 142. The first continuous drive belt 140 may be coupled between the first pair of gears 130. The second continuous drive belt 142 may be coupled between the second pair of gears 132.

The sliding door drive system 100 may further include at least one door bracket coupled to each of the first and second continuous drive belts 140, 142. As illustrated in FIGS. 1-6, sliding door drive system 100 may include a first door bracket 150 coupled to the first continuous drive belt 140 and a second door bracket 160 coupled to the second continuous drive belt 142. The first door bracket 150 may be configured to move between a first deployed position 152 and a first stored position 154. The second door bracket 160 may be configured to move between a second deployed position 162 and a second stored position 164. In certain optional embodiments, the first stored position 154 may be aligned with the second stored position 164. In other optional embodiments, the first stored position 154 may be offset from the second stored position 164.

Figure 4:
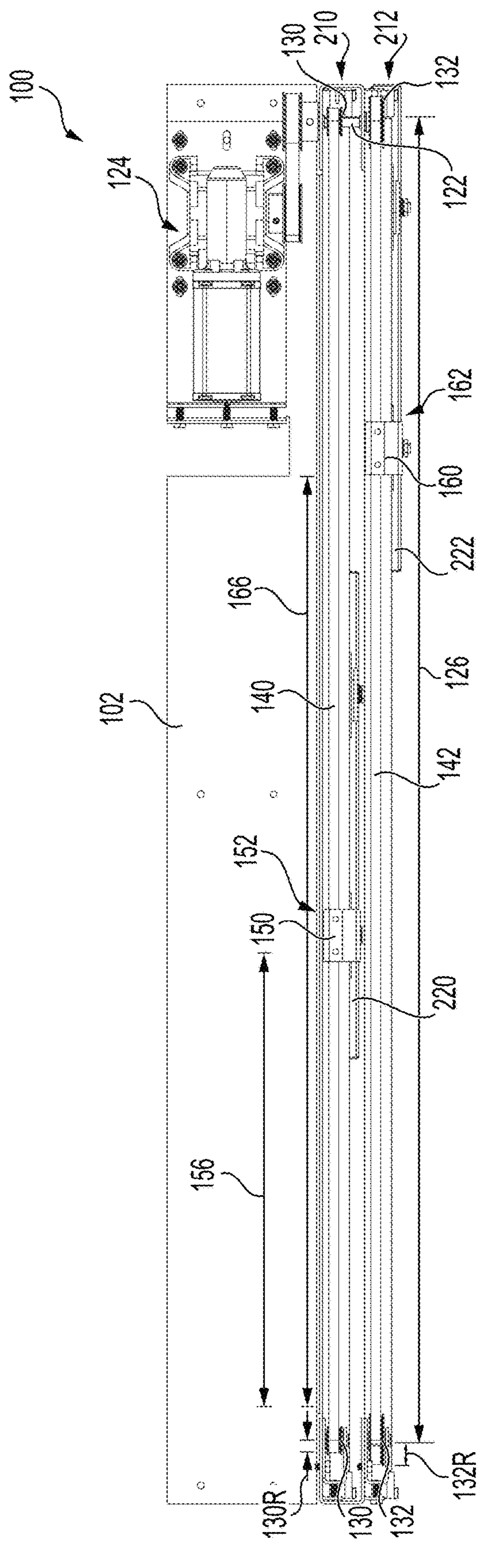
FIG. 4 is a top plan view of the sliding door drive system of FIG. 1 with the doors in the closed position in accordance with the present disclosure.
Figure 5:
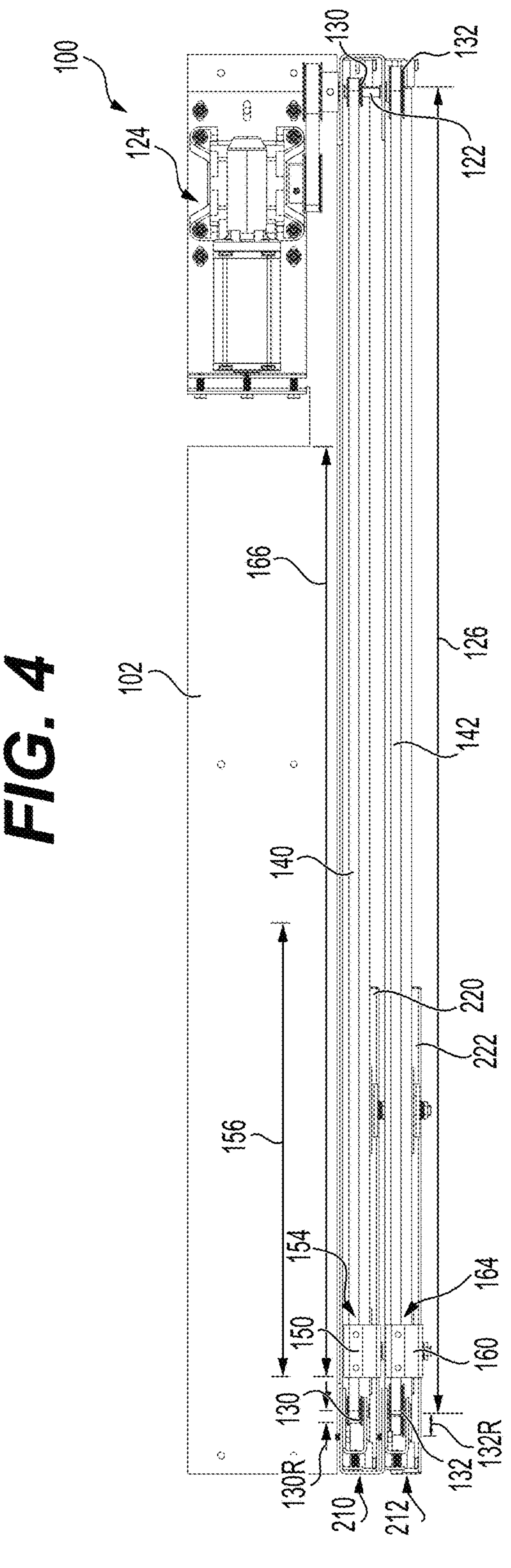
FIG. 5 is a top plan view of the sliding door drive system of FIG. 1 with the doors in the open position in accordance with the present disclosure.
Figure 6:
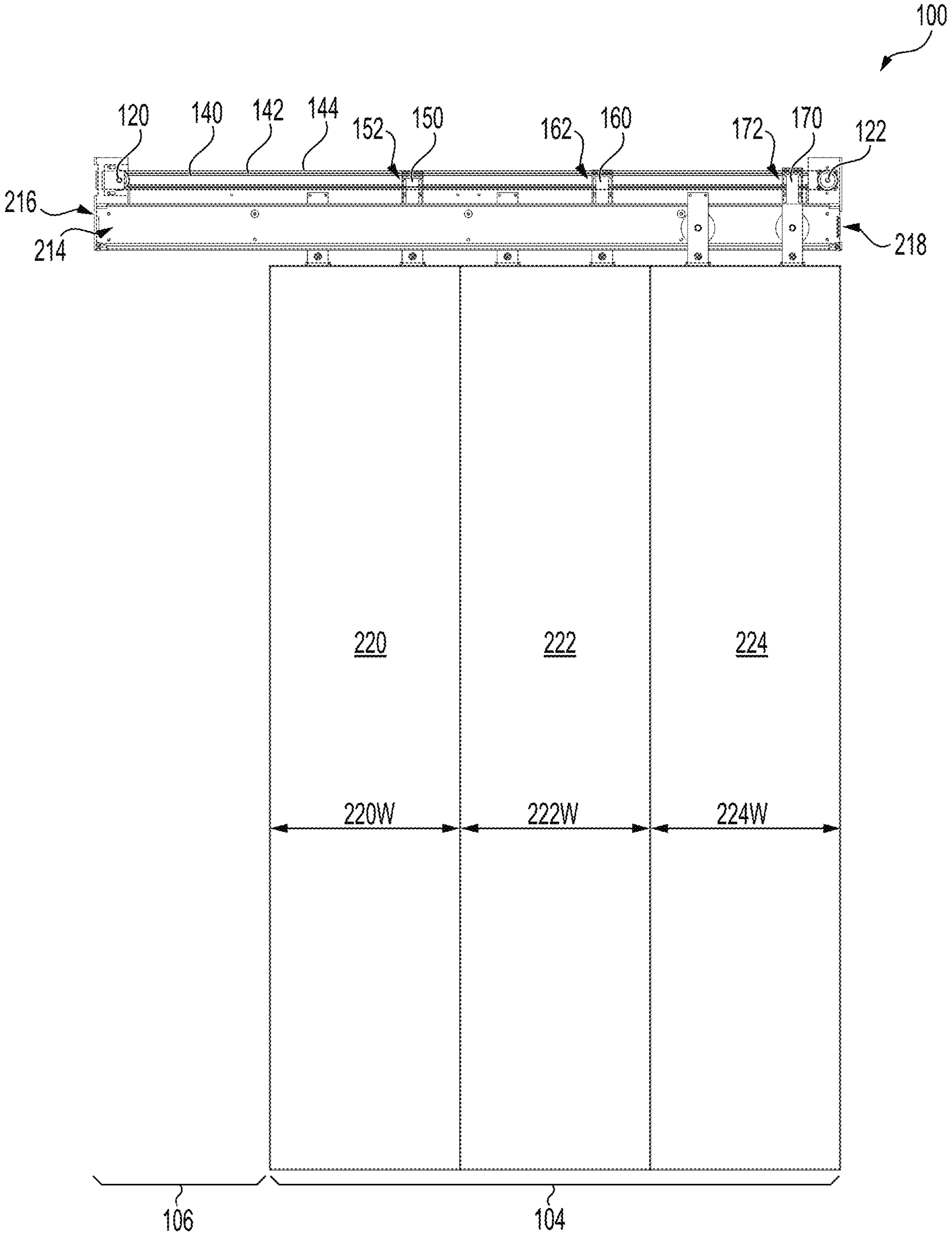
FIG. 6 is a front elevational view of an embodiment of a sliding door drive system in a three-speed side open configuration in accordance with the present disclosure.
Figure 7:
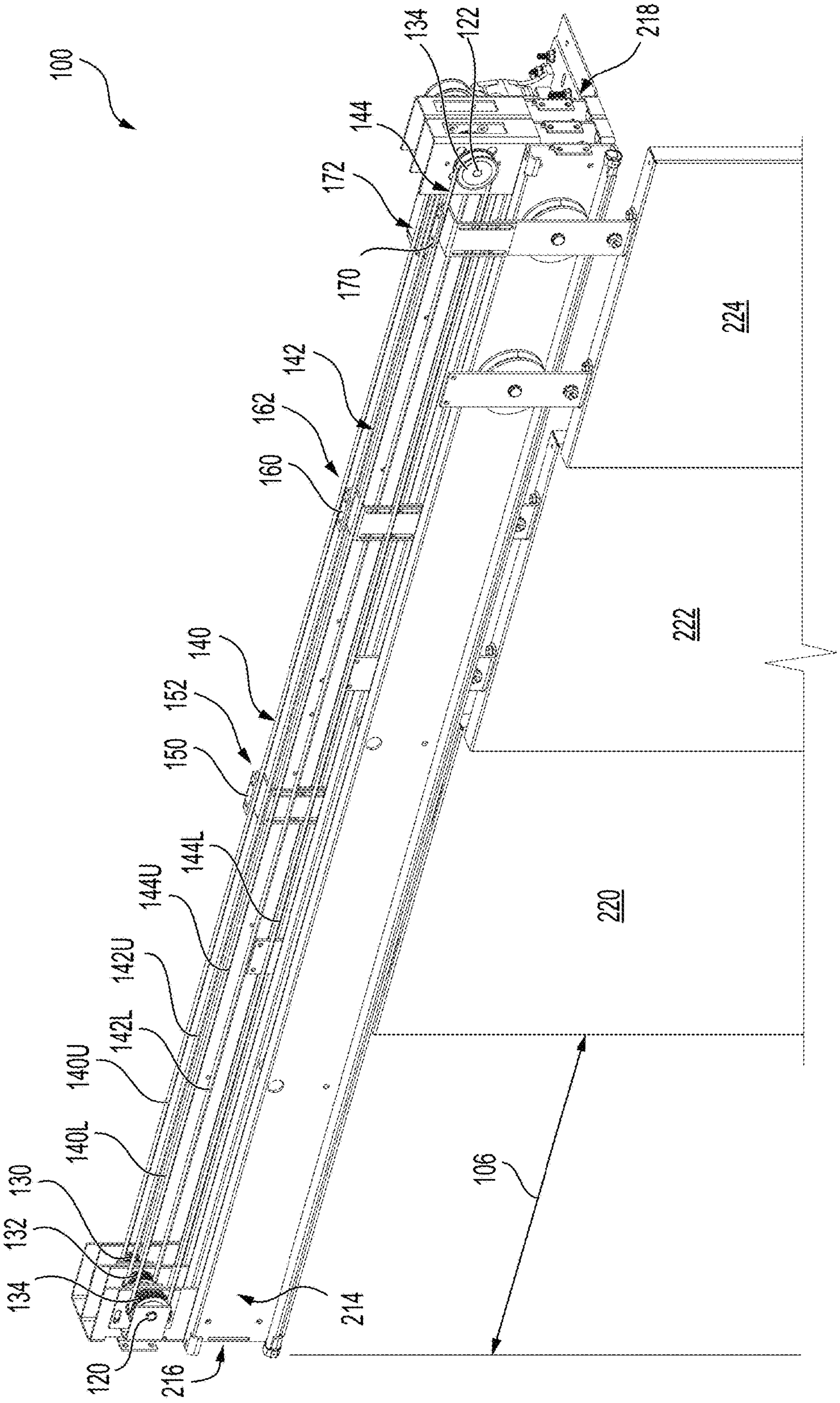
FIG. 7 is a perspective view of the sliding door drive system of FIG. 6 with doors in a closed position in accordance with the present disclosure.
Figure 8:
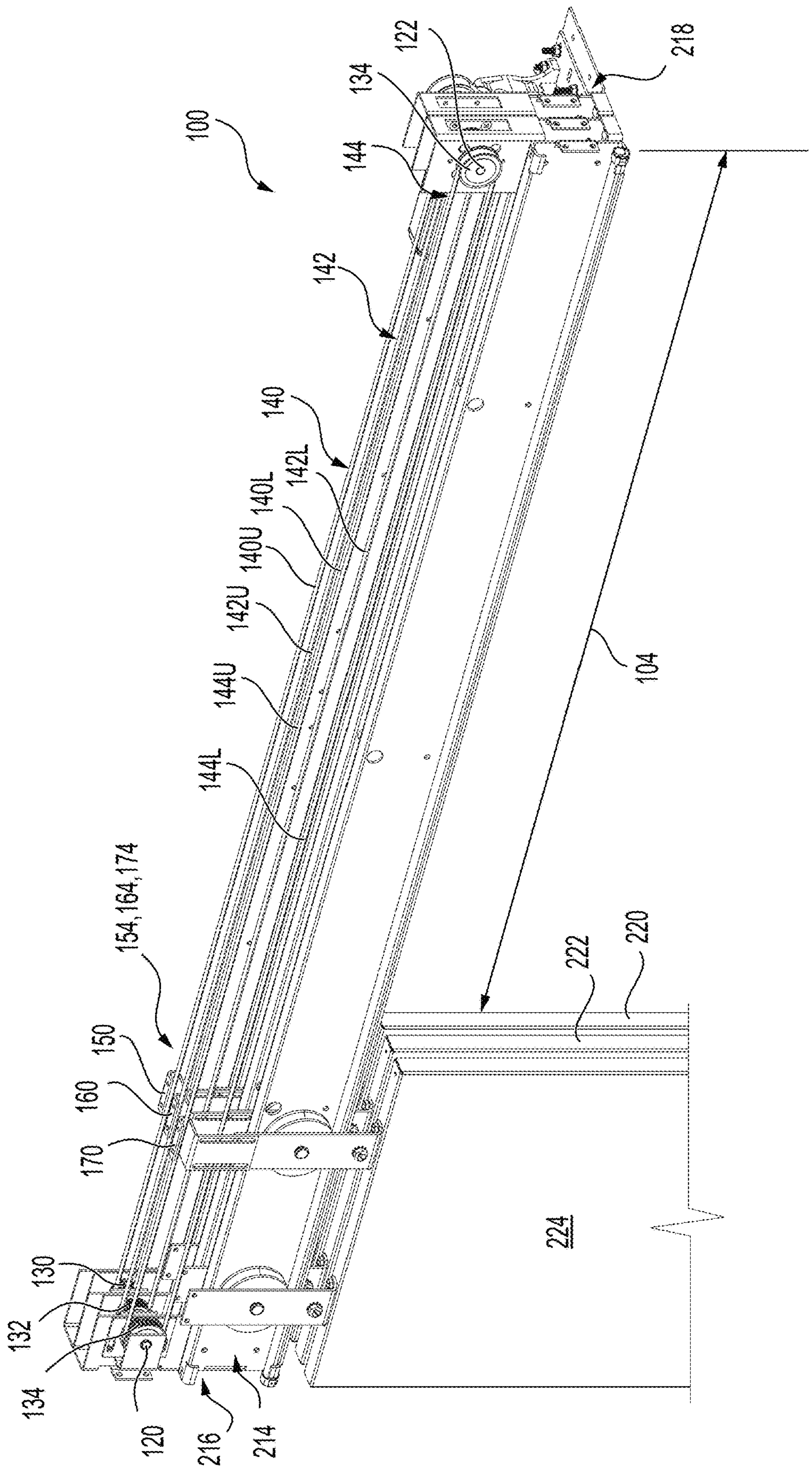
FIG. 8 is a perspective view of the sliding door drive system of FIG. 6 with the doors in an open position in accordance with the present disclosure.
Figure 9:
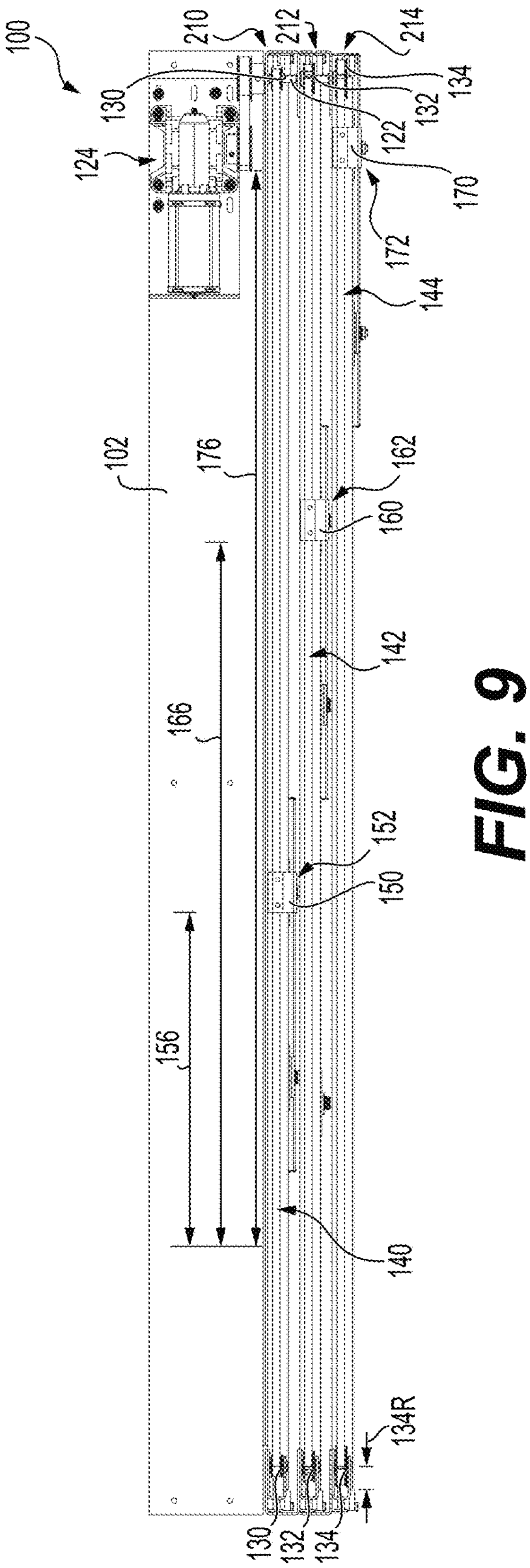
FIG. 9 is a top plan view of the sliding door drive system of FIG. 6 with the doors in the closed position in accordance with the present disclosure.

A first distance 156 may be defined between the first deployed position 152 and the first stored position 154 of the first door bracket 150. Similarly, a second distance 166 may be defined between the second deployed position 162 and the second stored position 164 of the second door bracket 160. The second distance 166 may be greater than the first distance 156. As illustrated in FIGS. 4-5, a spacing 126 between the drive axle 122 and each of the at least one idler axle 120 may be greater than the second distance 166. The spacing 126 may also be less than a summation of the first and second distances 156, 166. In certain optional embodiments, the spacing 126 may be greater than one-half (½) of a summation of the first and second distances 156, 166 and less than or equal to seven-eighths (⅞) of the summation of the first and second distances 156, 166, as shown in Equation 1, below.

$$\tfrac{1}{2}(D_1+D_2)\leq L_{DA\text{-}LA}\leq\tfrac{7}{8}(D_1+D_2) \qquad (1)$$

where $D_1$ is the first distance 156, $D_2$ is the second distance 166, and $L_{DA\text{-}LA}$ is the spacing 126 between the drive axle 122 and each of the at least one idler axle 120.

Since the drive motor 124 turns the drive axle 122 and each of the at least one idler axle 120, and the respective first and second pairs of gears 130, 132 simultaneously, and the first and second pairs of gears 130, 132 have different radiuses 130R, 132R, the first door bracket 150 moves between the first deployed position 152 and the first stored position 154 in a same time period as that of the second door bracket 160 between the second deployed position 162 and the second stored position 164. Similarly, since the second radius 132R of the second pair of gears 132 is greater than the first radius 130R of the first pair of gears 130, the second door bracket 160 travels between the second deployed position 162 and the second stored position 164 at a faster speed than that of the first door bracket 150 between the first deployed position 152 and the first stored position 154.

The first door bracket 150 may be configured to be coupled to a first door 220 slidably coupled to a first door track 210. The second door bracket 160 may be configured to be coupled to a second door 222 slidably coupled to a second door track 212. The first and second door tracks 210, 212 may be positioned adjacent and parallel to each other. In certain optional embodiments, the drive axle 122 may be positioned proximate a first end 216 of one or more of the first door track 210 or the second door track 212, and the at least one idler axle 120 may be positioned proximate to a second end 218. In certain optional embodiments, the drive axle 122 and second axles 120 may be offset from each of the first and second ends 216, 218 by at least largest one of the first, second, or third radiuses 130R, 132R, 134R. The first continuous drive belt 140 may be positioned above the first door track 210 and the second continuous drive belt 142 may be positioned above the second door track 212. While this embodiment illustrates the doors being configured to slide into a recess 106 positioned on the left, one of ordinary skill in the art will appreciate that the sliding door drive system 100 can be reconfigured such that the doors are configured to slide into a recess positioned on the right.

A ratio between the first radius 130R and the second radius 132R may be based at least in part on respective widths 220W, 222W of the first and second doors 220, 222. For example, if the doors are the same width, then the ratio between the first radius 130R and the second radius 132R may be 1:2 in order to ensure that both the first and second door brackets 150, 160 reach the first and second stored positions 154, 164 at the same time. In other optional embodiments, if the first door width 220W is smaller than the second door width 222W, then the ratio may be greater than 1:2 (e.g., 1:2.01, 1:2.1, 1:3, etc.). In further optional embodiments, if the first door width 220W is larger than the second door width 222W, then the ratio may be less than 1:2 (e.g., 1:1.99, 1.91, . . . 1:1.1, 1:1.01, etc.). A width of the opening 104 may be equal to a summation of the first and second door widths 220W, 222W. As such, another relationship between the first radius 130R and the second radius 132R may be defined as shown in Equation 2, below.

$$\frac{220W}{130R}=\frac{220W+222W}{132R} \qquad (2)$$

Referring to FIGS. 7-12, an embodiment of the sliding door drive system 100 is illustrated. This embodiment includes all of the elements of the embodiment shown in FIGS. 1-6 and may further include a third pair of gears 134. Each of the third pair of gears 134 may be coupled to a different one of the drive axle 122 and the at least one idler axle 120. One gear of the third pair of gears 134 may be coupled to a third idler axle. In certain optional embodiments (not shown), the one of each of the first, second, and third pairs of gears 130, 132, 134 may be coupled to a singular idler axle. The third pair of gear 134 may be aligned with each other and spaced apart from the first and second pairs of gears 130, 132 on the drive axle 122 and the at least one idler axle 120, respectively. Each of the third pair of gears 134 may have a third radius 134R larger than the second radius 132R. The sliding door drive system 100 may further include a third continuous drive belt 144 coupled between the third pair of gears 134. The sliding door drive system 100 may further include a third door bracket 170. The third door bracket 170 may be coupled to the third continuous drive belt 144. The third door bracket 170 may be configured to move between a third deployed position 172 and a third stored position 174. The third stored position 174 may be aligned with each of the first and second stored positions 154, 164. In other optional embodiments, the third stored position 174 may be offset from each of the first and second stored positions 154, 164.

Figure 10:
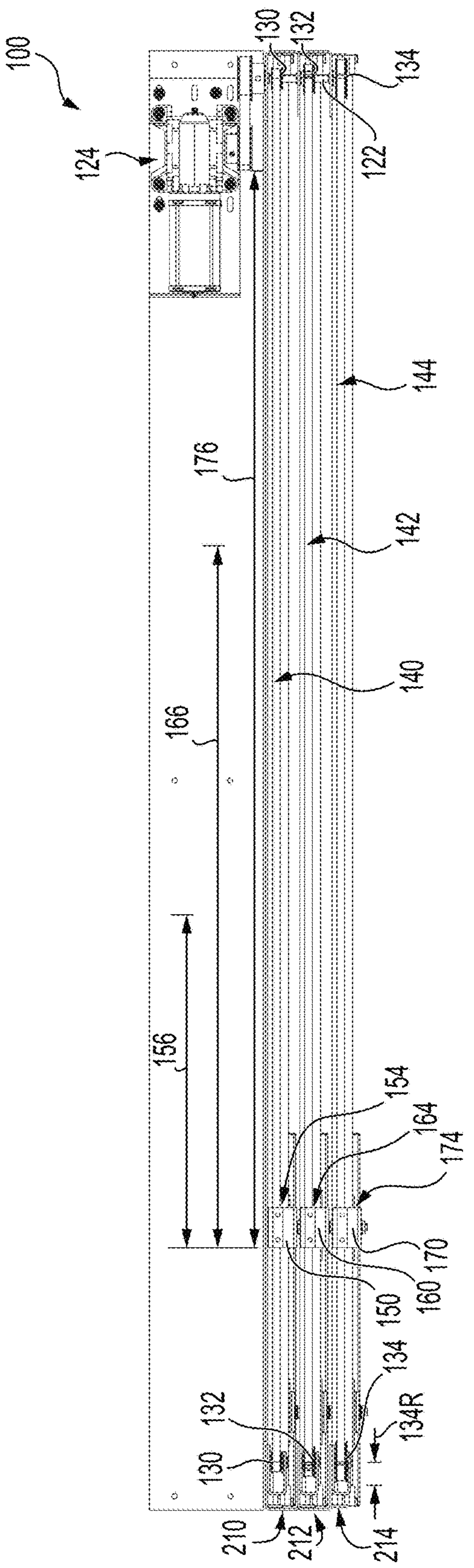
FIG. 10 is a top plan view of the sliding door drive system of FIG. 6 with the doors in the open position in accordance with the present disclosure.
Figure 11:
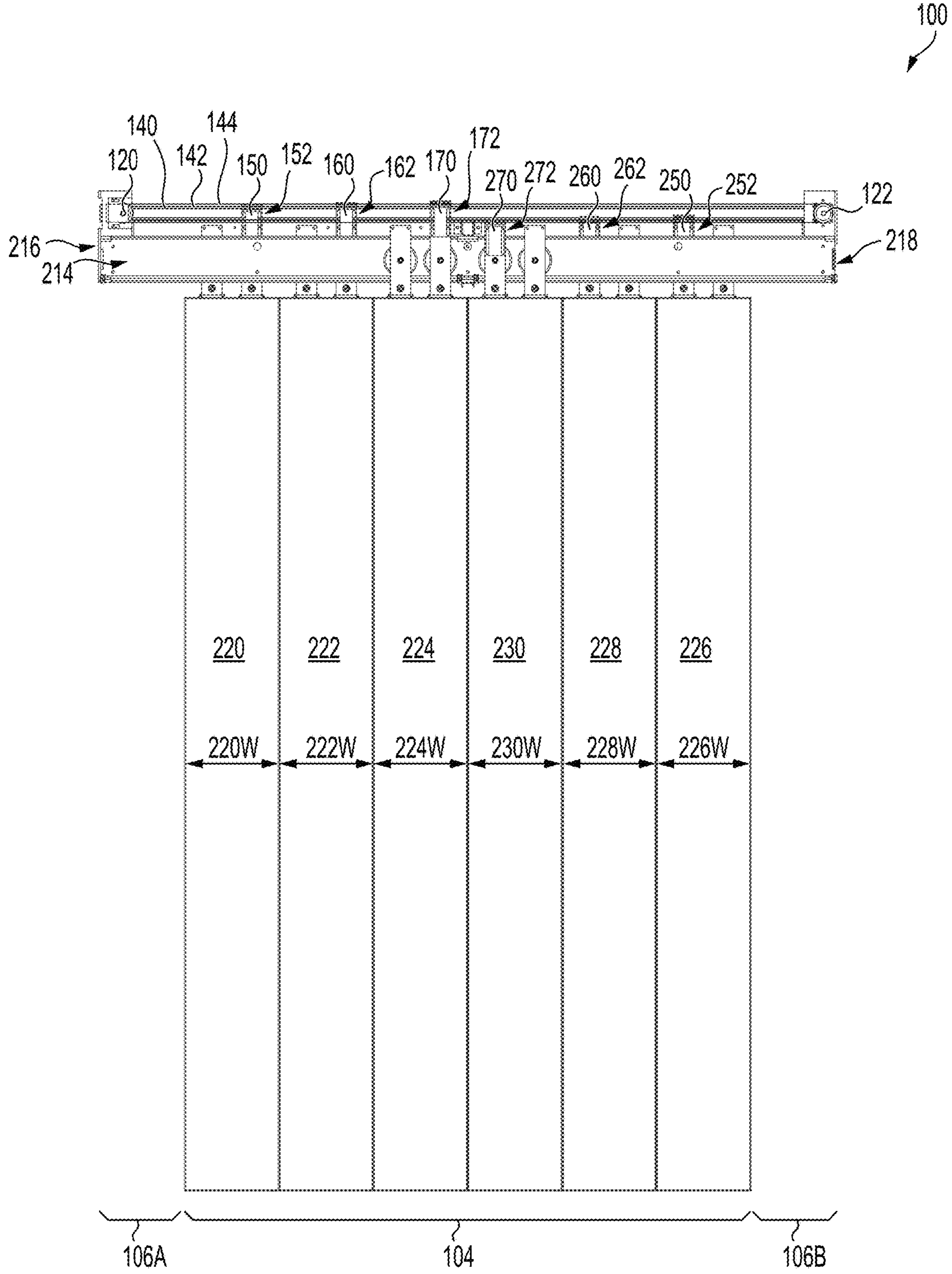
FIG. 11 is a front elevational view of an embodiment of a sliding door drive system in a two-speed center open configuration in accordance with the present disclosure.
Figure 12:
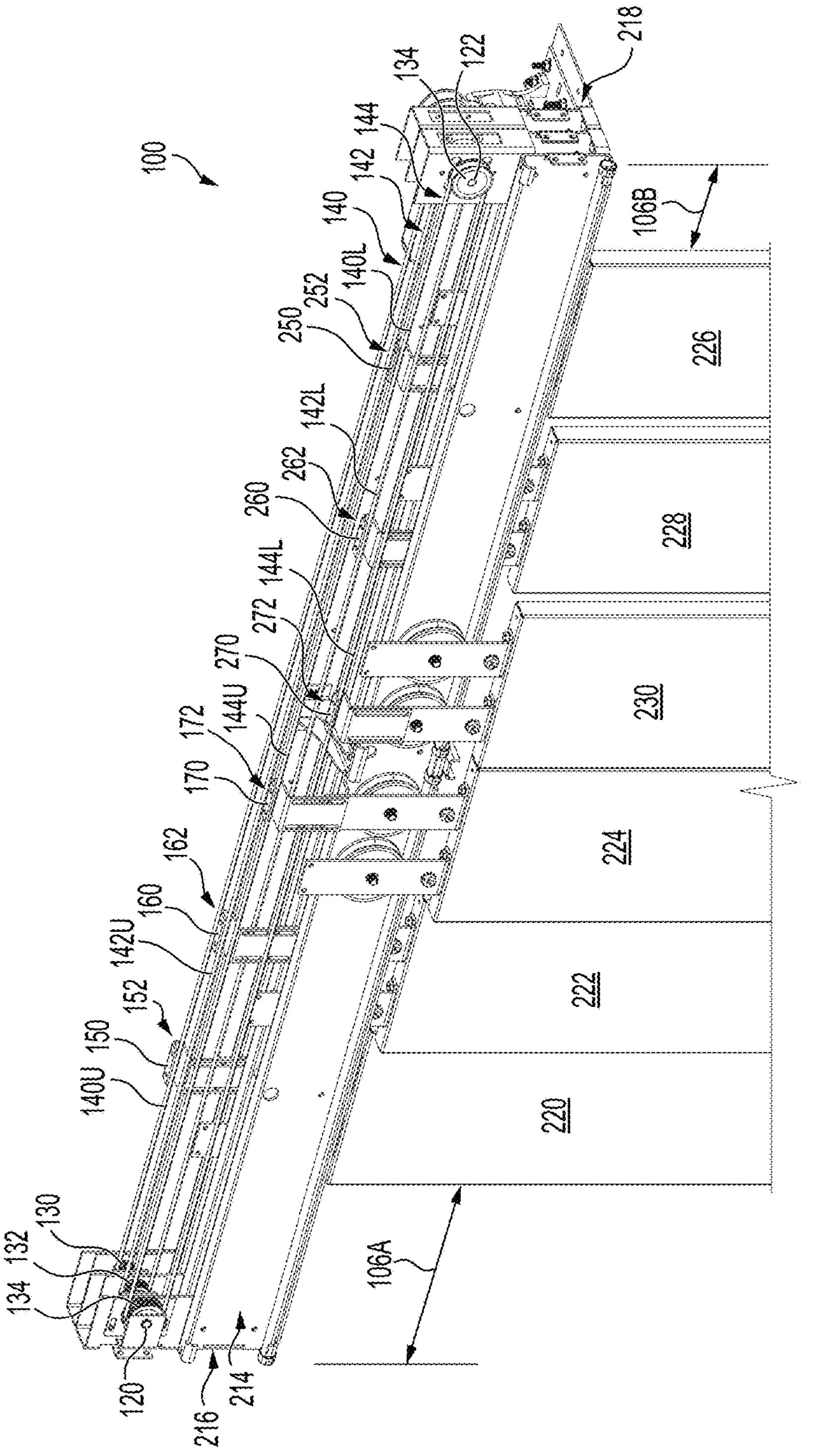
FIG. 12 is a perspective view of the sliding door drive system of FIG. 11 with doors in a closed position in accordance with the present disclosure.
Figure 13:
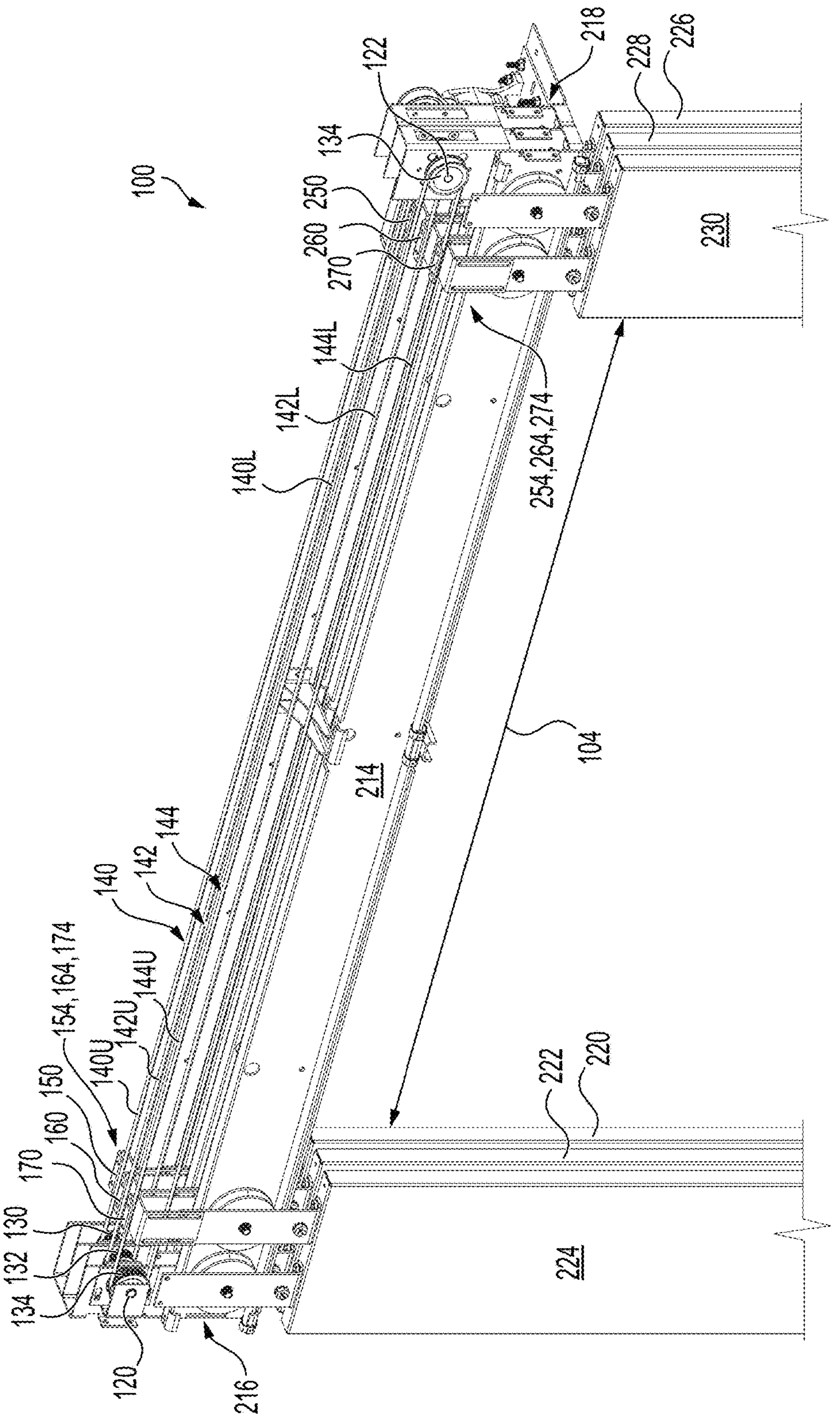
FIG. 13 is a perspective view of the sliding door drive system of FIG. 11 with the doors in an open position in accordance with the present disclosure.
Figure 14:
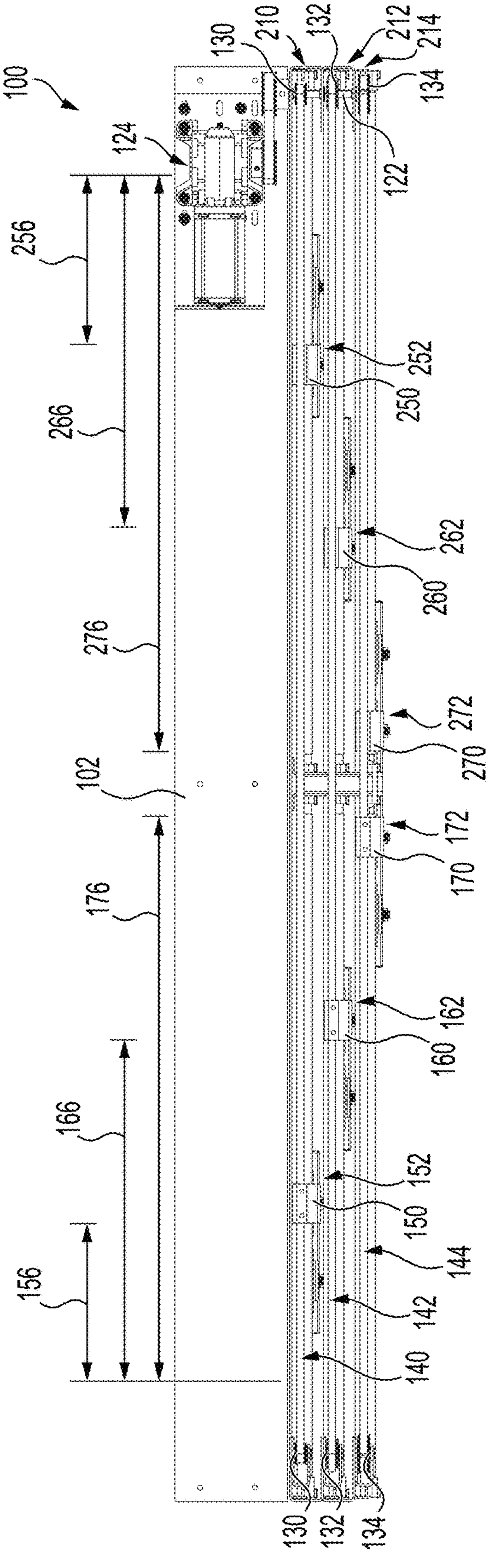
FIG. 14 is a top plan view of the sliding door drive system of FIG. 11 with the doors in the closed position in accordance with the present disclosure.
Figure 15:
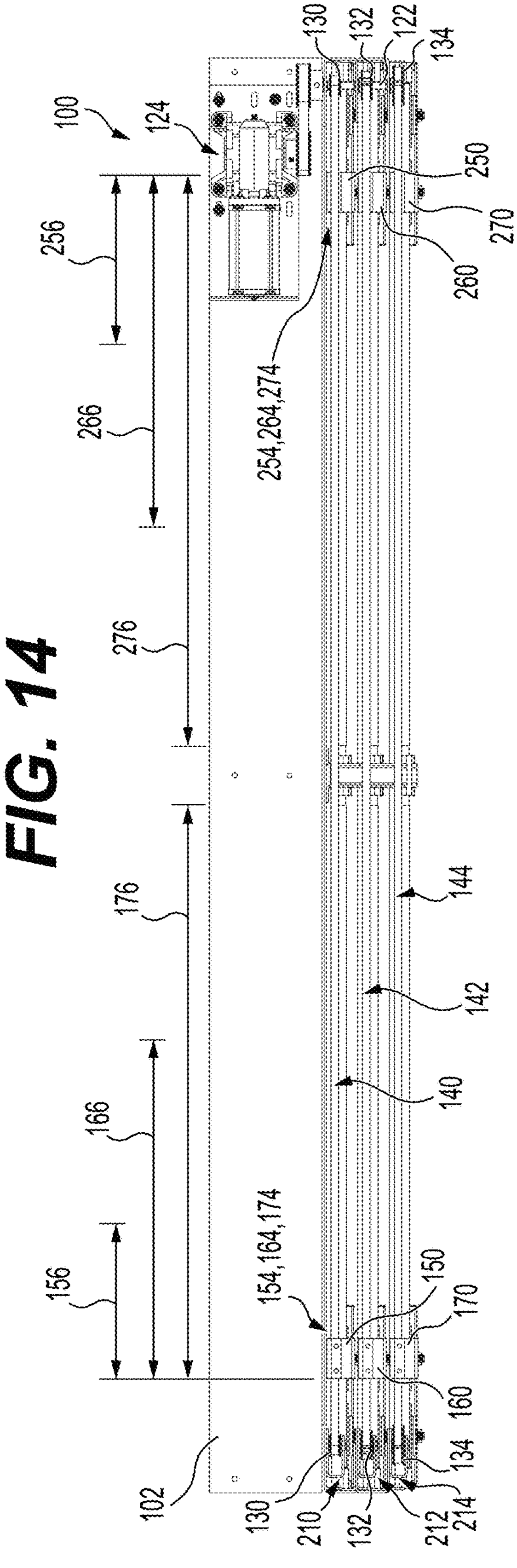
FIG. 15 is a top plan view of the sliding door drive system of FIG. 11 with the doors in the open position in accordance with the present disclosure.

A third distance 176 may be defined between the third deployed position 172 and the third stored position 174. The third distance 176 may be greater than the second distance 166. In certain optional embodiments, a summation of the first and second distances 156, 166 may be equal to the third distance 176. As illustrated in FIGS. 10-11, the spacing 126 between the drive axle 122 and each of the at least one idler axle 120 may be greater than the third distance 176. The spacing 126 may also be less than a summation of the first and third distances 156, 176. In certain optional embodiments, the spacing 126 may be greater than one-half (½) of a summation of the first, second, and third distances 156, 166, 176 and less than or equal to three-fifths (⅗) of the summation of the first, second, and third distances 156, 166, 176, as shown in Equation 3, below.

$$\tfrac{1}{2}(D_1+D_2+D_3)\leq L_{DA\text{-}LA}\leq\tfrac{3}{5}(D_1+D_2+D_3) \quad (3)$$

where $D_1$ is the first distance 156, $D_2$ is the second distance 166, $D_3$ is the third distance 176, and $L_{DA\text{-}LA}$ is the spacing 126 between the drive axle 122 and each of the at least one idler axle 120. Since the drive motor 124 turns the drive axle 122 and the at least one idler axle 120, and the respective first, second, and third pairs of gears 130, 132, 134 simultaneously, and the first, second, and third pairs of gears 130, 132, 134 have different radiuses 130R, 132R, 134R, the first door bracket 150 moves between the first deployed position 152 and the first stored position 154 in a same time period as that of the second door bracket 160 between the second deployed position 162 and the second stored position 164, and as that of the third door bracket 170 between the third deployed position 172 and the third stored position 174. Similarly, since the third radius 134R of the third pair of gears 134 is greater than the second radius 132R of the second pair of gears 132, the third door bracket 170 travels between the third deployed position 172 and the third stored position 174 at a faster speed than that of the second door bracket 160 between the second deployed position 162 and the second stored position 164.

The third door bracket 170 may be configured to be coupled to a third door 224 slidably coupled to a third door track 214. The third door track 214 may be positioned adjacent to the second door track 212 and parallel to each of the first and second door tracks 210, 212. The third continuous drive belt 144 may be positioned above the third door track 214. While this embodiment illustrates the doors being configured to slide into a recess 106 positioned on the left, one of ordinary skill in the art will appreciate that the sliding door drive system 100 can be reconfigured such that the doors are configured to slide into a recess positioned on the right.

A ratio between the first radius 130R, the second radius 132R, and the third radius 134R may be based at least in part on respective widths 220W, 222W, 224W of the first, second, and third doors 220, 222, 224. For example, if the doors are the same width, then the ratio between the first radius 130R, the second radius 132R, and the third radius 134R may be 1:2:3 in order to ensure that all three of the first, second, and third door brackets 150, 160, 170 reach the first, second, and third stored positions 154, 164, 174 at the same time. In other optional embodiments, if the doors are each of different widths, then the ratio may be adjusted accordingly to ensure that all three of the first, second, and third door brackets 150, 160, 170 reach the first, second, and third stored positions 154, 164, 174 at the same time. A width of the opening 104 may be equal to a summation of the first, second, and third door widths 220W, 222W, 224W. As such, another relationship between the first radius 130R, the second radius 132R, and the third radius 134R may be defined as shown in Equation 4, below.

$$\frac{220W}{130R}=\frac{220W+222W}{132R}=\frac{220W+222W+224W}{134R} \quad (4)$$

Referring to FIGS. 13-17, an embodiment of the sliding door drive system 100 is illustrated featuring a bi-parting three speed arrangement having three doors configured to slide into a first recess 106A positioned on the left and three other doors configured to slide into a second recess 106B positioned on the right. This embodiment includes all of the elements of the embodiment shown in FIGS. 7-12 and may further include a fourth door bracket 250 coupled to the first continuous drive belt 140, a fifth door bracket 260 coupled to the second continuous drive belt 142, and a sixth door bracket 270 coupled to the third continuous drive belt 144.

The fourth door bracket 250 may be configured to move between a fourth deployed position 252 and a fourth stored position 254. The fourth deployed position 252 may be positioned closer to the first deployed position 152 than the fourth stored position 254 is to the first stored position 154. The fifth door bracket 260 may be configured to move between a fifth deployed position 262 and a fifth stored position 264. The fifth deployed position 262 may be positioned closer to the second deployed position 162 than the fifth stored position 264 is to the second stored position 162. The sixth door bracket 270 may be configured to move between a sixth deployed position 272 and a sixth stored position 274. The sixth deployed position 272 may be positioned closer to the third deployed position 172 than the sixth stored position 274 is to the third stored position 174. Each of the fourth, fifth, and sixth stored positions 252, 262, 272 may be aligned. In other optional embodiments, each of the fourth, fifth, and sixth stored positions 252, 262, 272 may be offset.

Each of the first, second, and third continuous drive belts 140, 142, 144 may include an upper portion 140U, 142U, 144U, respectively, and a lower portion 140L, 142L, 144L defined between the first, second, or third pairs of gears 130, 132, 134, respectively. Each of the first, second, and third door brackets 150, 160, 170 are coupled to the upper portion of the first, second, or third continuous drive belts 140, 142, 144, respectively. In other optional embodiments, each of the first, second, and third door brackets 150, 160, 170 may be coupled to the lower portion of the first, second, or third continuous drive belts 140, 142, 144, respectively. Each of the fourth, fifth, and sixth door brackets 250, 260, 270 are coupled to the lower portion of the first, second, or third continuous drive belts 140, 142, 144, respectively. In other optional embodiments, each of the fourth, fifth, and sixth door brackets 250, 260, 270 may be coupled to the upper portion of the first, second, or third continuous drive belts 140, 142, 144, respectively. When the upper portion of each of the drive belts moves in one direction, for example, towards the drive axle 122, the lower portion moves in an opposite direction, for example, towards the at least one idler axle 120, and vise versa. As such, as the first, second, and third door brackets 150, 160, 170 move towards their respective stored positions in the first recess 106A, the fourth, fifth, and sixth door brackets 250, 260, 270 move towards their respective stored positions in the second recess 106B.

Figure 16:
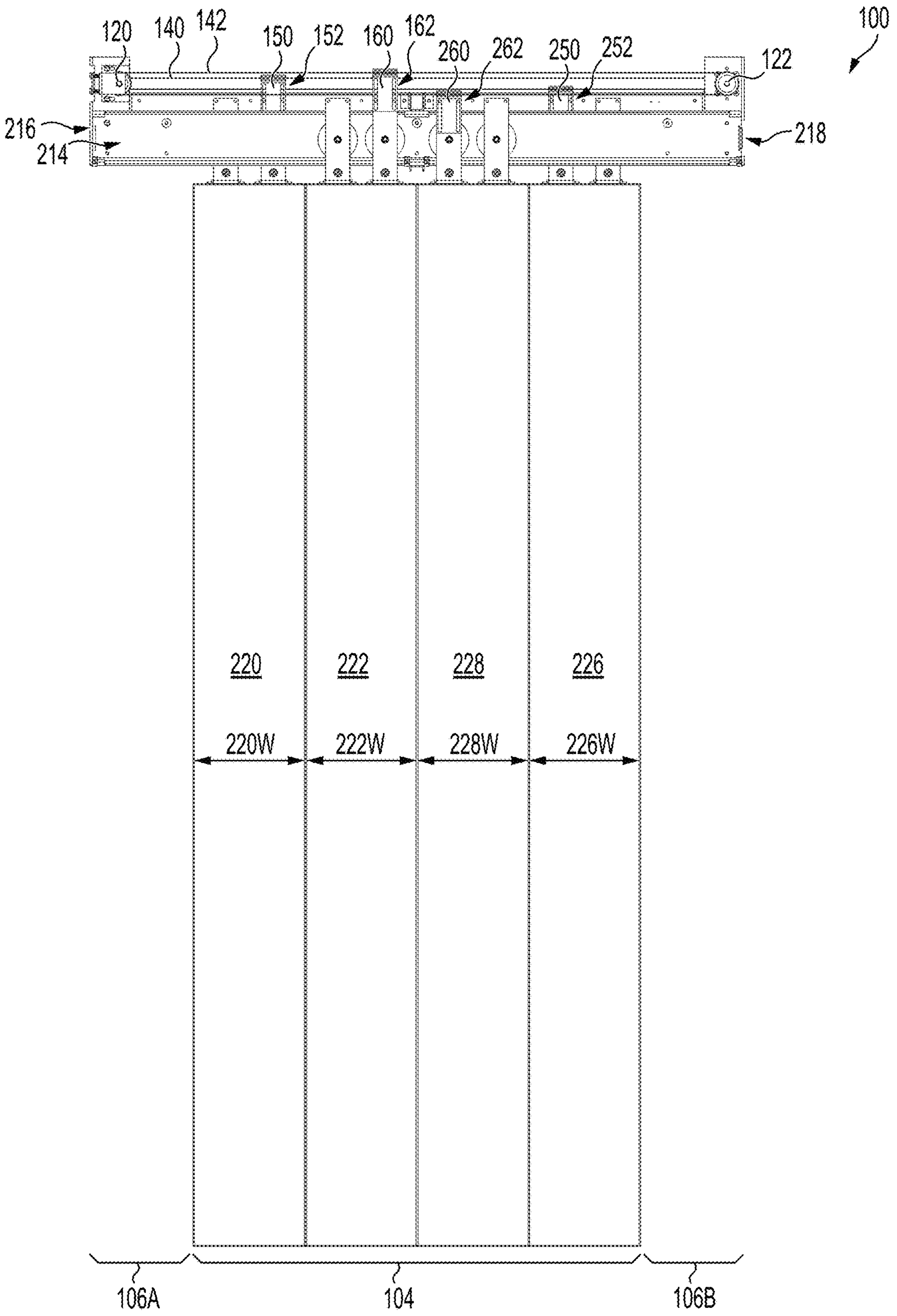
FIG. 16 is a front elevational view of an embodiment of a sliding door drive system in a three-speed center open configuration in accordance with the present disclosure.
Figure 17:
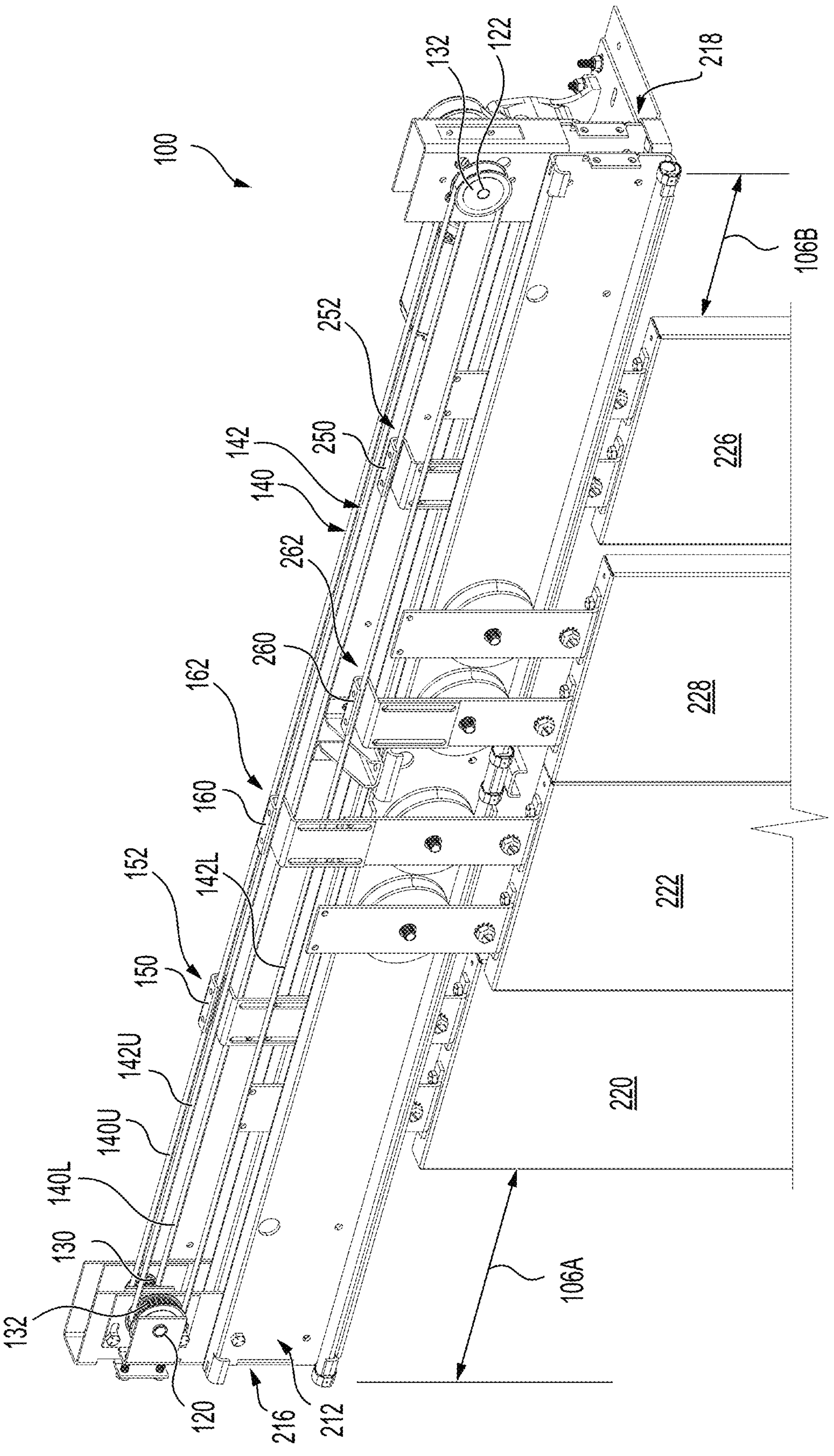
FIG. 17 is a perspective view of the sliding door drive system of FIG. 16 with doors in a closed position in accordance with the present disclosure.
Figure 18:
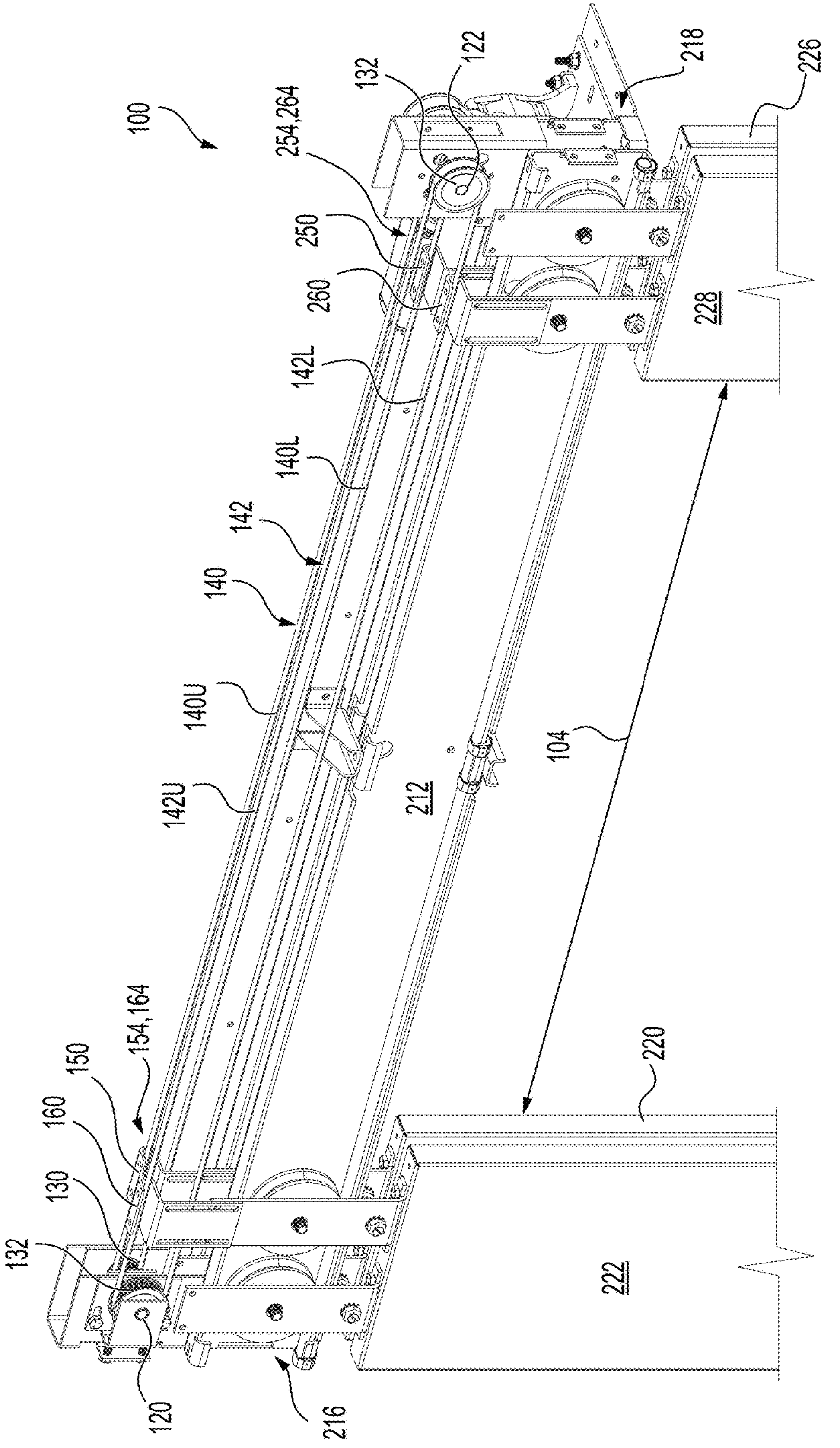
FIG. 18 is a perspective view of the sliding door drive system of FIG. 16 with the doors in an open position in accordance with the present disclosure.
Figure 19:
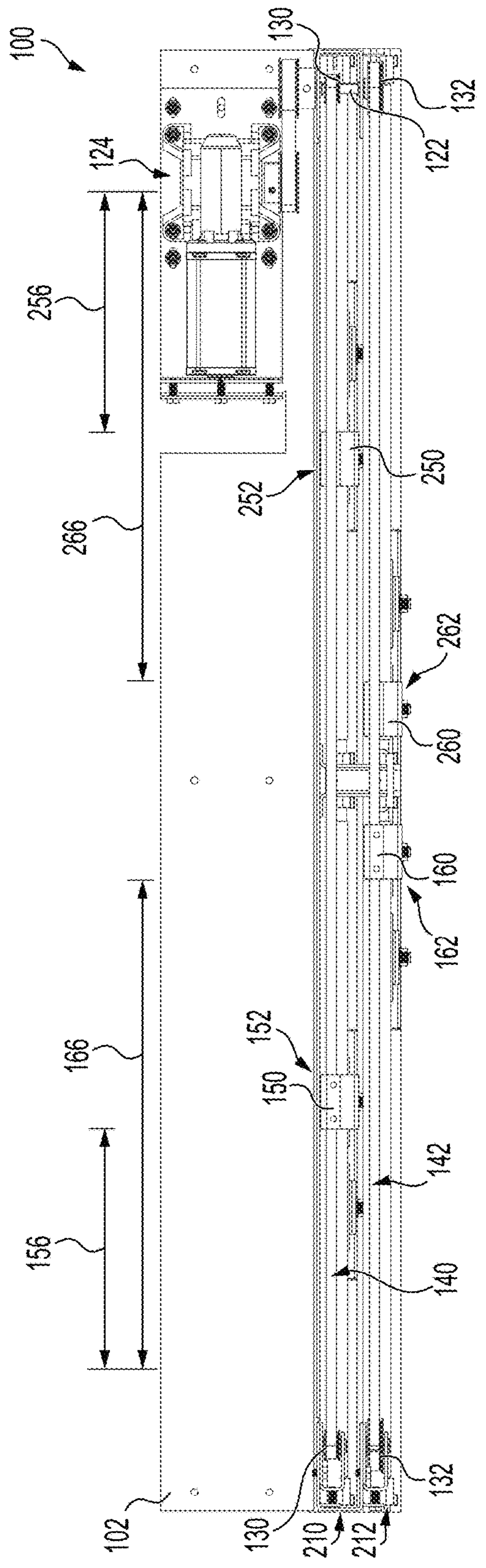
FIG. 19 is a top plan view of the sliding door drive system of FIG. 16 with the doors in the closed position in accordance with the present disclosure.
Figure 20:
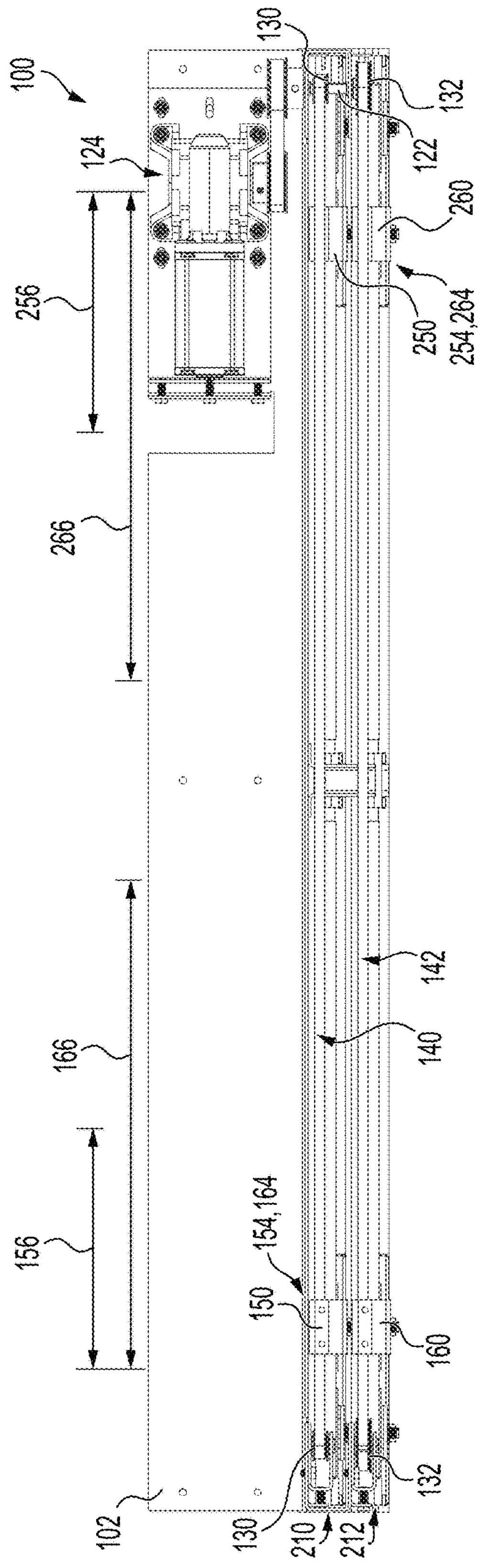
FIG. 20 is a top plan view of the sliding door drive system of FIG. 16 with the doors in the open position in accordance with the present disclosure.

A fourth distance 256 may be defined between the fourth deployed position 252 and the fourth stored position 254. A fifth distance 266 may be defined between the fifth deployed position 262 and the fifth stored position 264. A sixth distance 276 may be defined between the sixth deployed position 272 and the sixth stored position 274. The fourth distance 256 may be equal to the first distance 156. The fifth distance 266 may be equal to the second distance 166. The sixth distance 276 may be equal to the third distance 176. The sixth distance 276 may be greater than the fifth distance 266, and the fifth distance 26 may be greater than the fourth distance 256. In certain optional embodiments, a summation of the first and second distances 156, 166 may be equal to the third distance 176, and a summation of the fourth and fifth distances 256, 266 may be equal to the sixth distance 276. As illustrated in FIGS. 16-17, the spacing 126 between the drive axle 122 and each of the at least one idler axle 120 may be greater than a summation of the third distance 176 and the sixth distance 276. The spacing 126 may also be less than a summation of the first, third, fourth, and sixth distances 156, 176, 256, 276. In certain optional embodiments, the spacing 126 may be greater than one-half (½) of a summation of the first, second, third, fourth, fifth, and sixth distances 156, 166, 176, 256, 266, 276 and less than or equal to two-thirds (⅔) of the summation of the first, second, third, fourth, fifth, and sixth distances 156, 166, 176, 256, 266, 276, as shown in Equation 5, below.

$$\tfrac{1}{2}(D_1+D_2+D_3+D_4+D_5+D_6) \le L_{DA\text{-}LA} \le \tfrac{2}{3}(D_1+D_2+D_3+D_4+D_5+D_6) \quad (5)$$

where $D_1$ is the first distance 156, $D_2$ is the second distance 166, $D_3$ is the third distance 176, $D_4$ is the fourth distance 256, $D_5$ is the fifth distance 266, and Do is the sixth distance 276, and $L_{DA\text{-}LA}$ is the spacing 126 between the drive axle 122 and each of the at least one idler axle 120.

Since the drive motor 124 turns the drive axle 122 and the at least one idler axle 120, and the respective first, second, and third pairs of gears 130, 132, 134 simultaneously, and the first, second, and third pairs of gears 130, 132, 134 have different radiuses 130R, 132R, 134R, each of the first, second, third, fourth, fifth, and sixth door brackets 150, 160, 170, 250, 260, 270 move between their respective deployed and stored positions in a same time period. Since the first door bracket 150 and the fourth door bracket 250 are both coupled to the first continuous drive belt 140, they move at the same speed. Further, since the second door bracket 160 and the fifth door bracket 260 are both coupled to the second continuous drive belt 142, they move at the same speed. Likewise, since the third door bracket 170 and the sixth door bracket 270 are both coupled to the third continuous drive belt 144, they move at the same speed.

The fourth door bracket 250 may be configured to be coupled to a fourth door 226 slidably coupled to the first door track 210. The fifth door bracket 260 may be configured to be coupled to a fifth door 228 slidably coupled to the second door track 212. The sixth door bracket 270 may be configured to be coupled to a sixth door 224 slidably coupled to the third door track 214.

A ratio between the first radius 130R, the second radius 132R, and the third radius 134R may be based at least in part on respective widths 220W, 222W, 224W, 226W, 228W, 230W of the first, second, third, fourth, fifth, and sixth doors 220, 222, 224, 226, 228, 230. For example, if the doors are the same width, then the ratio between the first radius 130R, the second radius 132R, and the third radius 134R may be 1:2:3 in order to ensure that all six of the door brackets 150, 160, 170, 250, 260, 270 reach their respective stored positions at the same time. In other optional embodiments, if the doors are each of different widths, then the ratio may be adjusted accordingly to ensure that all six of the door brackets 150, 160, 170, 250, 260, 270 reach their respective stored positions at the same time. In certain optional embodiments, the widths 220W, 226W of the first and fourth doors 220, 226 may be the same, and the widths 222W, 228W of the second and fifth doors 222, 228 may be the same. Likewise, the widths 224W, 230W of the third and sixth doors 224, 230 may be the same. A width of the opening 104 may be equal to a summation of the first, second, third, fourth, fifth, and sixth door widths 220W, 222W, 224W, 226W, 228W, 230W. As such, another relationship between the first radius 130R, the second radius 132R, and the third radius 134R may be defined as shown in Equation 6, below.

$$\frac{220W}{130R} = \frac{220W + 222W}{132R} = \frac{220W + 222W + 224W}{134R} \quad (6)$$

where the first door width 220W is equal to the fourth door width 226W, the second door width 222W is equal to the fifth door width 228W, and the third door width 224W is equal to the sixth door width 230W.

Referring to FIGS. 18-22, another embodiment of the sliding door drive system 100 is illustrated featuring a bi-parting two speed arrangement having two doors configured to slide into a first recess 106A positioned on the left and two other doors configured to slide into a second recess 106B positioned on the right. This embodiment includes all of the elements of the embodiment shown in FIGS. 1-6 and some of the element of FIGS. 13-17, namely, the fourth and fifth door brackets 250, 260, as discussed below. This embodiment of the sliding door drive system 100 may further include the first and fourth door brackets 150, 250 coupled to the first continuous drive belt 140, and the second and fifth door brackets 160, 260 coupled to the second continuous drive belt 142. Similar to the embodiment discussed above, the fourth deployed position 252 may be positioned closer to the first deployed position 152 than the fourth stored position 254 is to the first stored position 154. Likewise, the fifth deployed position 262 may be positioned closer to the second deployed position 162 than the fifth stored position 264 is to the second stored position 164.

Similar to the embodiment discussed above, each of the first and second door brackets 150, 160 are coupled to the upper portion of the first or second continuous drive belts 140, 142, respectively. In other optional embodiments, each of the first and second door brackets 150, 160 may be coupled to the lower portion of the first or second continuous drive belts 140, 142, respectively. Each of the fourth and fifth door brackets 250, 260 are coupled to the lower portion of the first or second continuous drive belts 140, 142, respectively. In other optional embodiments, each of the fourth and fifth door brackets 250, 260 may be coupled to the upper portion of the first or second continuous drive belts 140, 142, respectively. When the upper portion of each drive belt moves in one direction, for example, towards the drive axle 122, the lower portion moves in an opposite direction, for example, towards the at least one idler axle 120, and vise versa. As such, as the first and second door brackets 150, 160 move towards their respective stored positions in the first recess 106A, the fourth and fifth door brackets 250, 260 move towards their respective stored positions in the second recess 106B.

As illustrated in FIGS. 21-22, the spacing 126 between the drive axle 122 and each of the at least one idler axle 120, may be greater than the summation of the second distance 166 and the fifth distance 266. The spacing 126 may also be less than a summation of the first, second, fourth, and fifth distances 156, 166, 256, 266. In certain optional embodiments, the spacing 126 may be greater than one-half (½) of a summation of the first, second, fourth, and fifth distances 156, 166, 256, 266, and less than or equal to seven-eighths (⅞) of the summation of the first, second, fourth, and fifth distances 156, 166, 256, 266, as shown in Equation 7, below.

$$\tfrac{1}{2}(D_1+D_2+D_4+D_5)\leq L_{DA\text{-}LA}\leq\tfrac{7}{8}(D_1+D_2+D_4+D_5) \quad (7)$$

where $D_1$ is the first distance 156, $D_2$ is the second distance 166, $D_4$ is the fourth distance 256, and $D_5$ is the fifth distance 266, and $L_{DA\text{-}LA}$ is the spacing 126 between the drive axle 122 and each of the at least one idler axle 120.

Since the drive motor 124 turns the drive axle 122 and the at least one idler axle 120, and the respective first and second pairs of gears 130, 132 simultaneously, and the first and second pairs of gears 130, 132 have different radius' 130R, 132R, each of the first, second, fourth, and fifth door brackets 150, 160, 250, 260 move between their respective deployed and stored positions in a same time period. Since the first door bracket 150 and the fourth door bracket 250 are both coupled to the first continuous drive belt 140 (e.g., upper 140U and lower portions 140L thereof), they move at the same speed as each other. Likewise, since the second door bracket 160 and the fifth door bracket 260 are both coupled to the second continuous drive belt 142, they move at the same speed. However, due to the size difference between the first and second pairs of gears 130, 132, second and fifth door brackets 160, 260 move faster than the first and fourth door brackets 150, 250.

The fourth door bracket 250 may be configured to be coupled to the fourth door 226 slidably coupled to the first door track 210, and the fifth door bracket 260 may be configured to be coupled to the fifth door 228 slidably coupled to the second door track 212.

A ratio between the first radius 130R and the second radius 132R may be based at least in part on respective widths 220W, 222W, 226W, 228W of the first, second, fourth, and fifth doors 220, 222, 226, 228. For example, if the doors are the same width, then the ratio between the first radius 130R and the second radius 132R may be 1:2 in order to ensure that all four of the door brackets 150, 160, 250, 260 reach their respective stored positions at the same time. In other optional embodiments, if the doors are each of different widths, then the ratio may be adjusted accordingly to ensure that all four of the first, second, and third door brackets 150, 160, 170 reach their respective stored positions at the same time. In certain optional embodiments, the widths 220W, 226W of the first and fourth doors 220, 226 may be the same, and the widths 222W, 228W of the second and fifth doors 222, 228 may be the same. This may help ensure that the distance each pair (e.g., based on their drive belt) needs to travel is the same. A width of the opening 104 may be equal to a summation of the first, second, fourth, and fifth door widths 220W, 222W, 226W, and 228W. As such, another relationship between the first radius 130R and the second radius 132R may be defined as shown in Equation 8, below.

$$\frac{220W}{130R} = \frac{220W + 222W}{132R} \quad (8)$$

where the first door width 220W is equal to the fourth door width 226W, and the second door width 222W is equal to the fifth door width 228W.

The sliding door drive system 100 as disclosed herein is extremely customizable and scalable. In various optional embodiments, the sliding door drive system 100 may include additional door brackets, pairs of gears, drive belts or the like. Similarly, the sliding door drive system 100 may implement a nonequal amount of doors sliding into each of the first and second recesses 106A, 106B.

Additionally, each of the door brackets (e.g., first, second, third, fourth, fifth, sixth, and so on) may take many different forms in different embodiments of the present invention. The illustrated embodiment is not meant to limit the scope of the present invention. In essence, the door brackets are couplers configured to couple a corresponding door to a corresponding drive belt. For example, in certain optional embodiments, the door brackets may be integrally formed with corresponding doors (e.g., as extension pieces, nubs, a mounting location, or the like) such that the doors are able to couple directly to corresponding drive belts. In other optional embodiments, as illustrated, the door brackets may be separate from the doors. In further optional embodiments, the door brackets may even take the form of a fastener, as defined above, and configured to couple a corresponding door, either directly or indirectly, to a corresponding drive belt.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrases "in one embodiment" or "in an embodiment" as used herein does not necessarily refer to the same embodiment, although it may.

Although embodiments of the present disclosure have been described in detail, it will be understood by those skilled in the art that various modifications can be made therein without departing from the spirit and scope of the discovery or invention as set forth in the appended claims.

This written description uses examples to describe the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the present disclosure. The principal features of this invention disclosed herein may be employed in various embodiments without departing from the scope of the disclosure. Those of ordinary skill in the art will recognize numerous equivalents to the specific procedures described herein. Such equivalents are considered to be within the scope of this disclosure and are covered by the claims.

All of the systems and/or components and methods of using such systems and/or components disclosed and claimed herein may be made and/or executed without undue experimentation in light of the present disclosure. While the systems, components, and methods of this invention have been described in terms of the embodiments included herein, it will be apparent to those of ordinary skill in the art that variations may be applied to the systems, components, and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A sliding door drive system comprising:

a drive axle configured to be driven by a drive motor;

at least one idler axle spaced apart from the drive axle and positioned parallel to the drive axle;

a first pair of gears, each of the first pair of gears coupled to a different one of the drive axle and the at least one idler axle and aligned with each other, each of the first pair of gears having a first radius;

a second pair of gears, each of the second pair of gears coupled to a different one of the drive axle and the at least one idler axle, the second pair of gears aligned with each other and spaced apart from the first pair of gears on the drive axle and the at least one idler axle, respectively, each of the second pair of gears having a second radius larger than the first radius;

a third pair of gears, each of the third pair of gears coupled to a different one of the drive axle and the at least one idler axle, the third pair of gears aligned with each other and spaced apart from the first and second pairs of gears on the drive axle and the at least one idler axle, respectively, each of the third pair of gears having a third radius larger than the second radius;

a first continuous drive belt coupled between the first pair of gears;

a second continuous drive belt coupled between the second pair of gears;

a third continuous drive belt coupled between the third pair of gears;

a first door bracket coupled to the first continuous drive belt, the first door bracket configured to move between a first deployed position and a first stored position;

a second door bracket coupled to the second continuous drive belt, the second door bracket configured to move between a second deployed position and a second stored position;

a third door bracket coupled to the third continuous drive belt, the third door bracket configured to move between a third deployed position and a third stored position;

a fourth door bracket coupled to the first continuous drive belt and configured to move between a fourth deployed position and a fourth stored position, the fourth deployed position positioned closer to the first deployed position than the fourth stored position is to the first stored position;

a fifth door bracket coupled to the second continuous drive belt and configured to move between a fifth deployed position and a fifth stored position, the fifth deployed position positioned closer to the second deployed position than the fifth stored position is to the second stored position; and a sixth door bracket coupled to the third continuous drive belt and configured to move between a sixth deployed position and a sixth stored position, the sixth deployed position positioned closer to the third deployed position than the sixth stored position is to the third stored position.

2. The sliding door drive system of claim 1, wherein:

the first door bracket is configured to be coupled to a first door, the second door bracket is configured to be coupled to a second door, and the third door bracket is configured to be coupled to a third door; and each of the first radius, the second radius, and the third radius are based at least in part on respective widths of the first, second, and third doors.

3. The sliding door drive system of claim 2, wherein:

a ratio between the first radius, the second radius, and the third radius is based at least in part on respective widths of the first, second, and third doors.

4. The sliding door drive system of claim 3, wherein:

the ratio is 1:2:3.

5. The sliding door drive system of claim 1, wherein:

a first distance $D_1$ is defined between the first deployed position and the first stored position;

a second distance $D_2$ is defined between the second deployed position and the second stored position, wherein $D_2$ is greater than $D_1$; and a third distance $D_3$ is defined between the third deployed position and the third stored position, wherein $D_3$ is greater than $D_2$.

6. The sliding door drive system of claim 5, wherein:

a spacing between the drive axle and the at least one idler axle is greater than $D_3$ and less than or equal to $D_1+D_3$.

7. The sliding door drive system of claim 5, wherein:

the second door bracket travels between the second deployed position and the second stored position at a faster speed than the first door bracket travels between the first deployed position and the first stored position; and the third door bracket travels between the third deployed position and the third stored position at a faster speed than the second door bracket travels between the second deployed position and the second stored position.

8. The sliding door drive system of claim 5, wherein:

the first door bracket moves between the first deployed position and the first stored position in a same time period as the second door bracket moves between the second deployed position and the second stored position; and the first door bracket moves between the first deployed position and the first stored position in a same time period as the third door bracket moves between the third deployed position and the third stored position.

9. The sliding door drive system of claim 1, wherein:

each of the first, second, and third continuous drive belts includes an upper portion and a lower portion defined between the first, second, or third pairs of gears, respectively;

the first, second, and third door brackets are coupled the upper portion of the first, second, or third continuous drive belts, respectively; and the fourth, fifth, and sixth door brackets are coupled to the lower portion of the first, second, or third continuous drive belts, respectively.

10. The sliding door drive system of claim 1, wherein:

the fourth door bracket is configured to be coupled to a fourth door, the fifth door bracket is configured to be coupled to a fifth door, and the sixth door bracket is configured to be coupled to a sixth door; and each of the first radius, the second radius, and the third radius are based at least in part on respective widths of the first, second, third, fourth, fifth, and sixth doors.

11. The sliding door drive system of claim 1, wherein:

the first stored position is aligned with the second stored position; and the second stored position is aligned with the third stored position.

12. A sliding door drive system comprising:

a drive axle configured to be driven by a drive motor;

at least one idler axle spaced apart from the drive axle and positioned parallel to the drive axle;

a first pair of gears, each of the first pair of gears coupled to a different one of the drive axle and the at least one idler axle and aligned with each other, each of the first pair of gears having a first radius;

a second pair of gears, each of the second pair of gears coupled to a different one of the drive axle and the at least one idler axle, the second pair of gears aligned with each other and spaced apart from the first pair of gears on the drive axle and the at least one idler axle, respectively, each of the second pair of gears having a second radius larger than the first radius;

a first continuous drive belt coupled between the first pair of gears, the first continuous drive belt having an upper portion and a lower portion defined between the first pair of gears;

a second continuous drive belt coupled between the second pair of gears, the second continuous drive belt having an upper portion and a lower portion defined between the second pair of gears;

a first door bracket coupled to one of the upper portion or the lower portion of the first continuous drive belt, the first door bracket configured to move between a first deployed position and a first stored position;

a second door bracket coupled to one of the upper portion or the lower portion of the second continuous drive belt, the second door bracket configured to move between a second deployed position and a second stored position;

a third door bracket coupled to a different one of the upper portion or the lower portion of the first continuous drive belt than the first door bracket and configured to move between a third deployed position and a third stored position, the third deployed position positioned closer to the first deployed position than the third stored position is to the first stored position; and a fourth door bracket coupled to a different one of the upper portion or the lower portion of the second continuous drive belt than the second door bracket and configured to move between a fourth deployed position and a fourth stored position, the fourth deployed position positioned closer to the second deployed position than the fourth stored position is to the second stored position.

13. The sliding door drive system of claim 12, wherein:

a first distance $D_1$ is defined between the first deployed position and the first stored position;

a second distance $D_2$ is defined between the second deployed position and the second stored position, wherein $D_2$ is greater than $D_1$;

a third distance $D_3$ is defined between the third deployed position and the third stored position; and a fourth distance $D_4$ is defined between the fourth deployed position and the fourth stored position, $D_4$ is greater than $D_3$.

14. The sliding door drive system of claim 13, wherein:

a spacing between the drive axle and the at least one idler axle is greater than $D_2+D_4$; and the spacing between the drive axle and the at least one idler axle is less than or equal to $D_1+D_2+D_3+D_4$.

15. The sliding door drive system of claim 13, wherein:

the second door bracket travels between the second deployed position and the second stored position at a faster speed than the first door bracket travels between the first deployed position and the first stored position; and the fourth door bracket travels between the fourth deployed position and the fourth stored position at a faster speed than the third door bracket travels between the third deployed position and the third stored position.

16. The sliding door drive system of claim 13, wherein:

the second door bracket travels between the second deployed position and the second stored position at a same speed as the fourth door bracket travels between the fourth deployed position and the fourth stored position; and the first door bracket travels between the first deployed position and the first stored position at a same speed as the third door bracket travels between the third deployed position and the third stored position.

17. The sliding door drive system of claim 13, wherein:

the first door bracket moves between the first deployed position and the first stored position in a same time period as the second door bracket moves between the second deployed position and the second stored position; and the third door bracket moves between the third deployed position and the third stored position in a same time period as the fourth door bracket moves between the fourth deployed position and the fourth stored position.

18. The sliding door drive system of claim 12, wherein:

the first door bracket is configured to be coupled to a first door, the second door bracket is configured to be coupled to a second door, the third door bracket is configured to be coupled to a third door, and the fourth door bracket is configured to be coupled to a fourth door; and a ratio between the first radius and the second radius is based at least in part on respective widths of the first, second, third, and fourth doors.

19. The sliding door drive system of claim 18 wherein: the ratio is 1:2.

20. The sliding door drive system of claim 12, wherein:

the first stored position is aligned with the second stored position; and the third stored position is aligned with the fourth stored position.

* * * * *